United States Patent
Ishibashi et al.

(10) Patent No.: US 11,364,465 B2
(45) Date of Patent: Jun. 21, 2022

(54) BUILDING, AND METHOD FOR CONTROLLING GAS MOLECULE CONCENTRATION IN LIVING AND/OR ACTIVITY SPACE IN BUILDING

(71) Applicants: C'STEC CORPORATION, Hokkaido (JP); HIEI KENSETSU CORPORATION, Hokkaido (JP); ISHIBASHI KENCHIKU JIMUSHO CORPORATION, Saga (JP); KINDAI SETSUBI SEKKEI JIMUSHO CORPORATION, Saga (JP)

(72) Inventors: Akira Ishibashi, Hokkaido (JP); Tsukio Eto, Saga (JP); Nobutoshi Noguchi, Saga (JP); Junji Matsuda, Hokkaido (JP)

(73) Assignees: C'STEC CORPORATION, Sapporo (JP); HIEI KENSETSU CORPORATION, Hokkaido (JP); ISHIBASHI KENCHIKU JIMUSHO CORPORATION, Saga (JP); KINDAI SETSUBI SEKKEI JIMUSHO CORPORATION, Saga (JP)

( * ) Notice: Subject to any disclaimer, the term of this patent is extended or adjusted under 35 U.S.C. 154(b) by 250 days.

(21) Appl. No.: 16/605,905

(22) PCT Filed: Mar. 23, 2018

(86) PCT No.: PCT/JP2018/011601
§ 371 (c)(1),
(2) Date: Oct. 17, 2019

(87) PCT Pub. No.: WO2018/193789
PCT Pub. Date: Oct. 25, 2018

(65) Prior Publication Data
US 2020/0171427 A1 Jun. 4, 2020

(30) Foreign Application Priority Data

Apr. 17, 2017 (JP) .............................. JP2017-081064

(51) Int. Cl.
*B01D 53/22* (2006.01)
*F24F 3/167* (2021.01)
(Continued)

(52) U.S. Cl.
CPC .......... *B01D 53/229* (2013.01); *B01D 46/521* (2013.01); *F24F 7/007* (2013.01); *B01D 2053/221* (2013.01); *B01D 2279/50* (2013.01)

(58) Field of Classification Search
CPC ........ B01D 46/10; B01D 46/52; B01D 53/22; B01D 53/229; B01D 2259/4508; F24F 7/00; F24F 7/007
(Continued)

(56) References Cited

U.S. PATENT DOCUMENTS

| 5,855,201 A * | 1/1999 | Fukui | ..................... B01D 63/02 |
| | | | 128/200.11 |
| 10,208,718 B2 * | 2/2019 | Clayton | ................. B01D 71/70 |

(Continued)

FOREIGN PATENT DOCUMENTS

| JP | 2014109432 | 6/2014 |
| JP | 2015111035 | 6/2015 |

(Continued)

OTHER PUBLICATIONS

International Search Report for Application No. PCT/JP2018/011601, dated Jun. 26, 2018.

*Primary Examiner* — Minh Chau T Pham
(74) *Attorney, Agent, or Firm* — K&L Gates LLP

(57) ABSTRACT

A room 100 in a building has a living etc. space 101 of volume V that is an enclosed space. Ventilation of an air flow
(Continued)

F is performed from the outside to the living etc. space 101. Entering/exiting of air as an air current between the inside of the living etc. space 101 and the outside is eliminated, and at least a part of the boundary between the living etc. space 101 and the outside is configured from a gas exchange membrane 310 having a diffusion constant D, a thickness L, and an area A for gas molecules of interest. When air inside the living etc. space 101 is sufficiently agitated and the concentration of gas molecules constituting the air is made spatially uniform, η(t) is controlled so as to vary according to $$\eta(t) = \eta_o - \frac{BL}{AD}(1 - \exp(-[AD/L]t/V)) \tag{9}$$

B(m³/s) is the gas consumption amount inside the living etc. space 101, $\eta_1(t)$ is the gas concentration inside the living etc. space 101 at time t, and η0 is the gas concentration of the outside.

6 Claims, 25 Drawing Sheets

(51) Int. Cl.
  *F24F 7/00* (2021.01)
  *F24F 7/007* (2006.01)
  *B01D 46/52* (2006.01)

(58) Field of Classification Search
  USPC .................... 55/385.2; 454/187; 128/200.11
  See application file for complete search history.

(56) References Cited

U.S. PATENT DOCUMENTS

| | | | |
|---|---|---|---|
| 10,677,483 B2* | 6/2020 | Ishibashi | F24F 7/06 |
| 2012/0104439 A1* | 5/2012 | Kim | H01L 33/08 |
| | | | 257/98 |
| 2015/0176852 A1* | 6/2015 | Ishibashi | F24F 7/06 |
| | | | 454/187 |
| 2016/0090910 A1* | 3/2016 | Ploeger | B01D 53/229 |
| | | | 60/783 |
| 2019/0118134 A1* | 4/2019 | Granados | B01D 53/229 |

FOREIGN PATENT DOCUMENTS

| | | |
|---|---|---|
| JP | 2015111042 | 6/2015 |
| JP | 2018071795 | 5/2018 |

\* cited by examiner

BUILDING, AND METHOD FOR CONTROLLING GAS MOLECULE CONCENTRATION IN LIVING AND/OR ACTIVITY SPACE IN BUILDING

TECHNICAL FIELD

The invention relates to a building, and a method for controlling gas molecule concentration in living and/or activity space in building. More particularly, the invention relates to a building such as a house etc. including rooms having a space in which for example, people do daily life and/or activity such as sleep, relax, operation, work, etc., and a method for controlling gas molecule concentration in such a living and/or activity space, the living and/or activity space being preferably used as a field of, for example, living, rest, experiment, production, painting work, nursing activity, medical/dental treatment, etc.

BACKGROUND ART

It may be said that with respect to information processing and communication environment, mankind realized a high convenient environment never realized since the dawn of history with development of computer technology at present. In other words, it can be said that a stimulating perfect good field for brain was realized. On the other hand, with respect to an environment for body, it cannot be said that modern society is always a good environment due to increase of pollution materials, floating of dusts or infectious bacteria in air, etc.

Assume now cases where persons act inside a living space with the oxygen consumption rate B(for example, exercise, sleep, enjoying a one-pot dish etc. by burning an easy gas ring, etc.). With respect to rooms in which general persons act, ventilation of a certain amount is required by law such as the Building Standards Act etc. This is usually achieved by introducing outside air of a certain amount into the room. With respect to a room partitioned by shoji, although outside air is not introduced mechanically into the room, the room and an adjacent room as a whole are regarded as one room. In this case, it is not always possible to say that the necessary area of shoji etc. has been estimated quantitatively based on modern science.

On the other hand, a clean environment exists for large-scale semiconductor manufacture conventionally. However, the clean environment is only for professional use, i.e., for industry. No clean environment for consumer used for general houses has been introduced. Once in the world of computers, personal computers flourished, carrying the banner for "Computer for the rest of us" and drawing the line between the personal computers and the large-scale computer main frame for business. Like this, while the importance of environment increases in twenty-first century, it may be hoped that "clean environment version" of personal computers appears. In fact, a personal clean space, which is the counterpart of just "main frame" as large-scale clean room with the high performance realized in long time ago, will surely become important in the future not only for pure consumer but also for scenes such as hospitals, institutions for the aged, etc. in which it is important to avoid risk of infection. Particularly, it will become more important in the future to control an air environment including a microbial environment in a living space for the problem of PM 2.5, pollinosis-control, further alleviation of symptoms of asthma, prevention of bacterially caused pneumonia, etc.

Under the background, present inventors proposed a system of highly clean rooms or a building, comprising: at least one room, the room including a living and/or work space that is an enclosed space, the room being provided with a fan filter unit provided with a blow opening so as to supply gases inside the living and/or work space, all of gases flowing inside the living and/or work space from the blowing opening being returned to an absorption opening of the fan filter unit, the wall of the room being provided with an opening to exhaust gases outside the living and/or work space. In the system of highly clean rooms or the building, by forming at least a part of an inner surface of the room by a wall including as a part a membrane not passing through dust particles but passing through gas molecules(gas exchange membrane), gas molecules inside the room can be exchanged through the membrane by concentration gradient between the outside space surrounding the room and the internal space of the room(see patent literatures 1-3). In this case, assuming that the volume of the living and/or work space is V, the diffusion constant of oxygen in the membrane included in the wall is D, and the thickness of the membrane is L, the room is designed by scaling the volume V and the area A of the membrane of $\{(V/A)/(D/L)\}$. Assuming that the oxygen consumption rate is B, the volume of oxygen inside the living and/or work space when it is in equilibrium with the outer space and oxygen is not consumed inside it is $V_{O_2}$, and the target oxygen concentration inside the living and/or work space is $\eta(\eta>0.18)$, the area A of the membrane is set so as to satisfy $$A \geq \frac{BL}{D\left(\frac{V_{O_2}}{V} - \eta\right)}$$

According to the system of highly clean rooms or the building, it is possible to realize a daily living space itself as a clean space of, for example, class 100 or higher looking like just a common room in appearance without decreasing its volume ratio. Furthermore, it is possible to keep the oxygen concentration inside the living and/or work space to the level required by law.

PRIOR ART LITERATURE

Patent Literature LITERATURE

PATENT LITERATURE 1: U.S. Pat. No. 5,329,720
PATENT LITERATURE 2: U.S. Pat. No. 5,839,426
PATENT LITERATURE 3: U.S. Pat. No. 5,839,429

SUMMARY OF INVENTION SUBJECTS TO BE SOLVED BY INVENTION

However, according to further research by the present inventors, it was found out that the area A necessary for the gas exchange membrane may be not always enough for gas exchange of carbon dioxide depending on the structure etc. inside the room. This is because the number of digits less than a decimal point of partial pressure of target gas to be controlled is different depending on kind of gas. Therefore, it is required to keep the concentration of carbon dioxide etc. inside the room to the level required by law or other reasons. However, no concrete proposal has been made heretofore.

On the other hand, there is a type of an air conditioner that is installed on the ceiling, while another type of a wall-mounted air conditioner that is installed on the wall of the room is frequently used.

Therefore, a subject to be solved by the invention is to provide a building that can realize a daily living and/or activity space itself as a clean space of class 100 or higher while matching with the standard format of a modern architecture and keep the concentrations of carbon dioxide etc. in addition to the oxygen concentration to the level required by law and other reasons based on a new concept of ventilation by utilizing fully the air circulation performance of a wall-mounted air conditioner etc. and is suitably used for, for example, schools etc. in foreign countries in which air environment is not always good as well as hospitals, public facilities and general homes in Japan, and a prefilter that is suitably attached to an absorption opening of the wall-mounted air conditioner of rooms of the building.

The above subjects and other subjects will be apparent from the following statement of this description referring to accompanying drawings.

Means for Solving the Subjects

In order to solve the above subject, according to the invention, there is provided a building comprising:
at least one room; and
at least one gas exchange device,
the room having inside a living and/or activity space that is an enclosed space,
a wall-mounted air conditioner being installed on the wall of the living and/or activity space, a prefilter made of a medium performance filter being attached to an air absorption opening of the top of the air conditioner, and all of gases flowing inside the living and/or activity space from a blow opening of the air conditioner being returned to the air absorption opening of the prefilter,
the gas exchange device having a box-like structure constituting an enclosed space with at least two gas absorption openings and at least two gas exhaustion openings,
one of the at least two gas absorption openings communicating with one of the at least two gas exhaustion openings and the other one of the at least two gas absorption openings communicating with the other one of the at least two gas exhaustion openings,
the two communicating paths being configured so that while they form independent paths respectively, they lies adjacent each other and they are separated by a membrane not passing through dust particles but passing through gas molecules,
air introduced from the outside space surrounding the room being introduced into the box-like structure of the gas exchange device from one of the gas absorption openings and sent out to the outside space from the gas blow opening communicating with the gas absorption opening, while air inside the living and/or activity space being introduced into the box-like structure of the gas exchange device from the other one of the gas absorption openings and returned to the living and/or activity space from the gas exhaustion opening communicating with the gas absorption opening,
the membrane having the area A' set by scaling of $\{(V/A')/(D'/L)\}$ where V is the volume of the living and/or activity space, A' is the area of the membrane, L is the thickness of the membrane, and D' is the diffusion constant of carbon dioxide in the membrane,
the area A' of the membrane being set so as to satisfy $$A' > \frac{B'L}{(\xi - \xi_o)D'} \tag{18}$$

where B' is the carbon dioxide generation rate inside the living and/or activity space, $\xi_0$ is the carbon dioxide concentration in equilibrium state with the outside when no carbon dioxide is generated inside the living and/or activity space, and $\xi(\xi<5000$ ppm) is the target carbon dioxide concentration inside the living and/or activity space.

Furthermore, according to the invention, there is provided a building comprising:
at least one room; and
at least one gas exchange device,
the room having inside a living and/or activity space that is an enclosed space,
a wall-mounted air conditioner being installed on the wall of the living and/or activity space, a prefilter made of a medium performance filter being attached to an air absorption opening of the top of the air conditioner, and all of gases flowing inside the living and/or activity space from a blow opening of the air conditioner being returned to the air absorption opening of the prefilter,
the gas exchange device having a box-like structure constituting an enclosed space with at least two gas absorption openings and at least two gas exhaustion openings,
one of the at least two gas absorption openings communicating with one of the at least two gas exhaustion openings and the other one of the at least two gas absorption openings communicating with the other one of the at least two gas exhaustion openings,
the two communicating paths being configured so that while they form independent paths respectively, they lies adjacent each other and they are separated by a membrane not passing through dust particles but passing through gas molecules,
air introduced from the outside space surrounding the room being introduced into the box-like structure of the gas exchange device from one of the gas absorption openings and sent out to the outside space from the gas blow opening communicating the gas absorption opening, while air inside the living and/or activity space being introduced into the box-like structure of the gas exchange device from the other one of the gas absorption openings and returned to the living and/or activity space from the gas exhaustion opening communicating with the gas absorption opening,
the membrane having the area not less than MAX(Amin, A'min) where Amin is the lower limit of the area A of the membrane obtained by the following (1) and A'min is the lower limit of the area A' of the membrane obtained by the following (2).
(1) the area A of the membrane satisfying A≥FL/D where A is the area of the membrane, L is the thickness of the membrane, D is the diffusion constant of gas molecules in the membrane and F is the ventilation air flow required for the living and/or activity space by law or other reasons.
(2) the area A' of the membrane satisfying $$A' > \frac{B'L}{(\xi - \xi_o)D'} \tag{18}$$

where the area A' of the membrane is set by scaling of $\{(V/A')/(D'/L)\}$ where V is the volume of the living and/or activity space, A' is the area of the membrane, L is the thickness of the membrane, and D' is the diffusion constant of carbon dioxide in the membrane, B' is the carbon dioxide generation rate inside the living and/or activity space, $\xi_0$ is the carbon dioxide concentration in equilibrium state with the outside when no carbon dioxide is generated in the living and/or activity space, and $\xi(\xi<5000$ ppm) is the target carbon dioxide concentration inside the living and/or activity space.

Here, the lower limit Amin of the area A of the membrane equals to the right side of A≥FL/D and the lower limit A'min of the area A' of the membrane is the minimum value satisfying the formula (18). MAX(Amin, A'min) means the bigger one of Amin and A'min.

In the invention of the building, the gas exchange device is preferably configured so that air inside the living and/or activity space is introduced into the box-like structure from the other one of the gas absorption openings and an air flow f that is returned to the living and/or activity space from the gas exhaustion opening communicating with the gas absorption opening is set for F so as to satisfy f≥F.

Furthermore, according to the invention, there is provided a prefilter to be attached to an air absorption opening of the top of a wall-mounted air conditioner of a building, comprising:
 a medium performance filter,
 the building comprising:
 at least one room; and
 at least one gas exchange device,
 the room having inside a living and/or activity space that is an enclosed space,
 a wall-mounted air conditioner being installed on the wall of the living and/or activity space,
 the gas exchange device having a box-like structure constituting an enclosed space with at least two gas absorption openings and at least two gas exhaustion openings,
 one of the at least two gas absorption openings communicating with one of the at least two gas exhaustion openings and the other one of the at least two gas absorption openings communicating with the other one of the at least two gas exhaustion openings,
 the two communicating paths being configured so that while they form independent paths respectively, they lies adjacent each other and they are separated by a membrane not passing through dust particles but passing through gas molecules,
 air introduced from the outside space surrounding the room being introduced into the box-like structure of the gas exchange device from one of the gas absorption openings and sent out to the outside space from the gas blow opening communicating with the gas absorption opening, while air inside the living and/or activity space being introduced into the box-like structure of the gas exchange device from the other one of the gas absorption openings and returned to the living and/or activity space from the gas exhaustion opening communicating with the gas absorption opening,
 the membrane having the area A' set by scaling of $\{(V/A')/(D'/L)\}$ where V is the volume of the living and/or activity space, A' is the area of the membrane, L is the thickness of the membrane, and D' is the diffusion constant of carbon dioxide in the membrane, the area A' of the membrane being set so as to satisfy $$A' > \frac{B'L}{(\xi - \xi_o)D'} \quad (18)$$

where B' is the carbon dioxide generation rate inside the living and/or activity space, $\xi_0$ is the carbon dioxide concentration in equilibrium state with the outside when no carbon dioxide is generated in the living and/or activity space, and $\xi(\xi<5000$ ppm) is the target carbon dioxide concentration inside the living and/or activity space, the prefilter being configured so that when the prefilter is attached to the air absorption opening of the air conditioner, all of gases flowing inside the living and/or activity space from the blow opening of the air conditioner is returned to the air absorption opening of the prefilter.

Here, the gas exchange device in each invention mentioned above is preferably installed in a space between the wall constituting the room and the living and/or activity space, more particularly, for example, a space between the roof and the ceiling or the inside of the double wall formed on the sidewall of the room, however not limited to this and it may be installed in a place selected as necessary.

The room is constituted of an enclosure constituting an enclosed space and its concrete example is a room of a building etc. The building may be all rooms supporting human activity such as, for example, detached houses, apartments, condominiums, hospitals, movie theaters, nursing institutions, schools, preschools, kindergartens, gyms, factories, paint rooms, lacquer rooms, etc. The room can be also applied to, for example, a room inside a mobile body with an internal space. The mobile body may be, for example, cars, especially ambulances, planes, passenger trains, passenger buses, sailboats, passenger boats, etc.

In the building, there is no entering/exiting of air as an air current between the inside of the living and/or activity space and the outside. However, since at least a part of the boundary between the living and/or activity space and the outside is separated by the membrane, the building has the refresh performance of inside gases, which is equivalent to direct entering/exiting of gases between the inside of the living and/or activity space and the outside. Here, no entering/exiting of air as an air current means, for example, that the incoming and outgoing air currents for the living and/or activity space are strictly zero during operation of the building. However, its meaning is not limited to this and it includes, for example, entering/exiting of a clean air current with the flow rate much smaller than the flow rate of air subjected to 100% circulation feedback in the living and/or activity space. Furthermore, no net air current between the inside of the living and/or activity space and the outside includes, for example, that pressure inside and outside of the room are the same.

The living and/or activity space is a space in which people do daily life or activity such as sleep, relax, work, labor, etc., and is preferably used as a field of living, rest, experiment, production, painting work, nursing activity, medical/dental treatment, etc.

The membrane not passing through dust particles but passing through gas molecules (gas exchange membrane) is not essentially limited as far as it does not pass through dust particles but pass through gas molecules between spaces separated by the membrane. For example, the membrane not passing through dust particles but passing through gas molecules can preferably exchange gas molecules through the membrane when the pressure difference between spaces separated by the membrane is zero but there is a difference of partial pressure of gas constituents constituting air on both sides of the membrane. Here, "not passing through dust particles" includes not only the case where dust particles cannot pass through completely (100%) but also the case where dust particles cannot pass through not strictly 100% (hereafter the same). Concretely, the membrane is, for example, shoji paper from ancient times that is used generally, medium performance filter, HEPA filter, ULPA filter, etc. More specifically, although the blocking rate (passing rate) of dust particles is not 100% (0%), the blocking rate of particles having a particle diameter of 10 µm or more is not less than 90% (not larger than 10%), preferably not larger than 99% (1%). Material of the membrane not passing through dust particles but passing through gas molecules is selected as necessary. For example, filter materials of a dust filter, shoji paper, nonwoven fabric, synthetic fibers such as polyester, acryl, etc., cellulose fibers such as pulp, rayon, etc. can be used.

The medium performance filter used for the prefilter is not limited particularly, and for example, its collection efficiency for particles having the particle diameter of 10 µm or more is not less than 60% and not larger than 98%. The medium performance filter preferably has a shape in which planar filter material such as shoji paper etc. is repeatedly folded, i.e., a shape obtained by folding the planar filter material as valley-shape and mountain shape, though it is not limited to the shape.

Described now is a method of deriving the inequality A≥FL/D and the formula (18) in the invention.

Considered now is a living and/or activity space (a space in which persons live or act) having the volume V. Suppose that ventilation of air flow F is performed according to the Building Standards Act etc. It may be considered that air inside the space is sufficiently and quickly agitated and gas molecules constituting air inside the space become sufficiently and quickly uniform and here the dependency on space coordinates can be ignored inside the room. Suppose that activity using the oxygen consumption rate B($m^3$/s) is performed in the room. Supposing that the oxygen concentration inside the room at time t is $\eta(t)$ and the oxygen concentration of the outside (=the oxygen concentration when oxygen is not consumed inside the room) is $\eta_0$, the volume of oxygen $V\eta(t+\delta t)$ at time $t+\delta t$ can be expressed by using the volume of oxygen $V\eta(t)$ at time t as follows.

$$V\eta(t+\delta t) = V\eta(t) - B\delta t + \eta_o F\delta t - \eta(t)F\delta t \quad (1)$$

The second term of the formula (1) indicates the decrease of the volume of oxygen due to oxygen consumption during time interval(t, t+δt), the third term indicates the increase of the volume of oxygen due to introduction of fresh air (having the oxygen concentration η0) of the outside through ventilation of air flow F during the time interval and the fourth term indicates the decrease of the volume of oxygen due to exhaustion of inside air (note that its oxygen concentration is η(t)) of the same amount (with supply of outside air of the above air flow F). By transposing the first term of the right side to the left side and thereafter dividing the both sides by δt, a differential equation:

$$V\frac{d\eta(t)}{dt} = -B + (\eta_o - \eta(t))F \quad (2)$$

is obtained. As the initial condition, the oxygen concentration inside the room is equal to that of the outside space at t=0, so η(0)=η0 is satisfied. Therefore, the solution to the differential equation (2) is obtained as follows.

$$\eta(t) = \eta_o - \frac{B}{F}(1 - \exp(-Ft/V)) \quad (3)$$

When enough time has passed, the system reaches to the steady state and the exponential function part of the formula (3) becomes zero or the left side of the formula (2) becomes zero. Therefore, the inside oxygen concentration converges to the constant value $$\eta = \eta_o - \frac{B}{F} \quad (4)$$

On the other hand, when the living and/or activity space having the volume V is established as an isolated system that does not enter/exit an air current with the outside, an air current crossing "the boundary with the outside space" that defines the living and/or activity space as an enclosed space becomes zero. That is, the air flow flowing into the above room (=the air flow flowing from the room) F is zero. Instead of this, a partition is formed in a part of the boundary by using a membrane having gas exchange performance. The area of the membrane is denoted as A, the thickness is denoted as L and the diffusion constant of gas molecules passing through the membrane is denoted as D. Suppose that oxygen is consumed at B ($m^3$/s) per unit time as the same as the above in the room forming an isolated enclosed space. Avogadro number is denoted as N0, the volume of gases per 1 mol at the pressure of the system (~1 atm) is denoted as C, the area of the partition(gas exchange membrane) is denoted as A and the flux of oxygen introduced into the enclosure through the partition is denoted as j. Then the volume of oxygen at time t+δt, Vη(t+δt) is expressed using the volume of oxygen at time t, Vη(t) as follows.

$$V\eta(t+\delta t) = V\eta(t) - B\delta t + \frac{CA\ j\delta t}{N_0} \quad (5)$$

Here, it was assumed that the dependency on space coordinates can be ignored inside the living and/or activity space with good approximation (as described later, when a 100% circulation feedback system is constructed inside the room, air inside the living and/or activity space can be sufficiently and quickly agitated by an air current generated by the air conditioner and gas molecules constituting air can be made uniform sufficiently and quickly inside the living and/or activity space).

The third term of the right side of the formula (5) is the number of oxygen molecules flowing due to the difference of the oxygen concentration (concentration gradient) of both sides of the gas exchange membrane(i.e., between the inside of the living and/or activity space and the outside) (here oxygen is introduced into the living and/or activity space not as air current but by diffusion of molecules and its nature is totally different from the phenomenon described by the formulas (1)~(4) described above). j in the formula (5) is given as follows.

$$j = D\nabla\varphi \quad (6)$$

Here, φ denotes the number of oxygen molecules per unit volume inside the living and/or activity space and D denotes the diffusion constant of oxygen in the gas exchange membrane. When the direction perpendicular to the gas exchange membrane is set to be x axis, ∇ is the differential operator in the x axis. Assume that the volume of the living and/or activity space is V and the thickness of the gas exchange membrane is L. L is smaller than size of the living and/or activity space by about three digit and the gas exchange membrane can be regarded very thin. Therefore, the formula (5) can be approximated with good approximation as follows.

$$V\eta(t+\delta t) = V\eta(t) - B\delta t + AD\frac{(\eta_o - \eta(t))}{L}\delta t \quad (7)$$

Here, η0 is the oxygen concentration of the outside as the same as the formula (1) and the formula (2) and usually about 20.9%. From the formula (7), the differential equation is derived as follows.

$$V\frac{d\eta(t)}{dt} = -B + AD\frac{(\eta_o - \eta(t))}{L} \quad (8)$$

The exact solution to the formula (8) can be obtained as follows.

$$\eta(t) = \eta_o - \frac{BL}{AD}(1 - \exp(-[AD/L]t/V)) \quad (9)$$

Here, it is interesting to see the solution corresponding to the stationary state after enough time has passed. Therefore, by setting the left side of the formula (8)=0, the oxygen concentration at time t can be obtained as follows(the oxygen concentration is the same as that of the case where t→∞ in the formula (9)).

$$\eta = \eta_0 - BL/AD \quad (10)$$

Compared here are the method that secures the oxygen concentration inside the room by performing ventilation of the air flow F according to the Building Standards Act etc. and the case where the membrane having function of the gas exchange membrane such as shoji paper etc. is used for a part of the living and/or activity space to supply oxygen inside the room(within the enclosure) from the outside (by utilizing the phenomenon that oxygen diffuses in the gas exchange membrane in a direction in which the concentration gradient decreases). That is, comparing the formula (2) and the formula (8) (or the formula (4) and the formula (8)), $$F = AD/L \quad (11)$$

is obtained. As a result, it is shown that the method that secures the oxygen concentration inside the room by performing ventilation of the air flow F according to the Building Standards Act etc. and the usage of the gas exchange membrane such as shoji paper etc. having the area A, the thickness L and the diffusion constant D of molecules in a part of the boundary between the room and the outside are equivalent. This is because that nitrogen in air is basically bystander for activity to maintain life. It is easy to understand from analogy that while the conventional ventilation of nonzero air flow corresponds to "whole blood donation", the method of this invention corresponds to "blood component donation". Effectiveness of shoji from ancient time of Japan can be understood now strictly and quantitatively. From dimension analysis, while the air flow F has dimension of [m³/s], AD/L has dimension of [(m²·m³/s)/m]=[m³/s], just dimension of the air flow and therefore equivalency of both is supported. That is, the method of securing the oxygen concentration inside the room by performing ventilation of the air flow F according to the Building Standards Act etc. can secure the same oxygen exchange ability by using the gas exchange membrane having A, D, L satisfying the formula (11) in the boundary between the airtight living and/or activity space and the outside. The boundary may be a single gas exchange membrane(referred as GEM, as necessary) or a unit, i.e., a gas exchange box(referred as G×B, as necessary) in which many gas exchange membranes are integrated and inside air and outside air flow as laminar flow in both sides of each gas exchange membrane. With this, it is possible to obtain the gas exchange membrane(having the quantitative area constituting a part of the enclosed space) capable of supplying necessary gas components(for example, oxygen) inside the airtight living and/or activity space from the outside, or exhausting unnecessary gas components(for example, carbon dioxide) to the outside from the inside of the enclosed space not by ventilation based on the mechanical driving force but through diffusion occurred in a place where the concentration gradient exists. Since law of equipartition of energy holds, diffusion constants of each gas molecule in the gas exchange membrane only depend on the squared root (the inverse of this) of the mass of each molecule. Therefore, for example, diffusion constants of carbon dioxide and oxygen have the same digit but their precoefficients are slightly different each other(both diffusion constants are on the order of ~$10^{-5}$ m²/s).

Considered now is consumption of oxygen and generation of carbon dioxide when burning occurs inside the living and/or activity space. When carbon is burned simply, $$C + O_2 = CO_2$$

holds and when glucose burns, finally $$C_6H_{12}O_6 + 6O_2 = 6CO_2 + 6H_2O$$

holds. Therefore, the ratio of consumption of oxygen and generation of carbon dioxide is about 1:1. Change of the carbon dioxide concentration ξ(t) with burning of carbon compounds directs toward increase of the concentration with burning. Therefore, when the inside concentration increases, carbon dioxide is emitted to the outside. Accordingly, $$V\xi(t+\delta t) = V\xi(t) + B'\delta t - A'D'\frac{(\xi(t) - \xi_o)}{L}\delta t \quad (12)$$

holds where B'(m³/s) is the carbon dioxide generation rate, ξ0 is the carbon oxide concentration of the outside, A' is the area of the gas exchange membrane and D' is the diffusion constant of carbon dioxide in the gas exchange membrane. From this, $$V\frac{d\xi(t)}{dt} = B' - A'D'\frac{(\xi(t) - \xi_o)}{L} \quad (13)$$

is obtained. When the carbon dioxide concentration is in equilibrium state between the inside and the outside at time t=0, ξ(0)=ξ0. Therefore, the solution to the formula is as follows.

$$\xi(t) = \xi_o + \frac{B'L}{A'D'}(1 - \exp(-[A'D'/L]t/V)) \quad (14)$$

After enough time has passed, the carbon dioxide concentration converses to $$\xi = \xi_o + \frac{B'L}{A'D'} \quad (15)$$

When the inside carbon dioxide concentration is the value C0 larger than the formula (15) at time t=0, the solution to the formula (13) is as follows.

$$\xi(t) = \left(Co - \left[\xi_o + \frac{B'L}{A'D'}\right]\right)\exp(-[A'D'/L]t/V)) + \left[\xi_o + \frac{B'L}{A'D'}\right] \quad (16)$$

Suppose now that the carbon dioxide concentration inside the living and/or activity space is first in equilibrium state with the outside space and persons act inside the living and/or activity space. The carbon dioxide concentration inside the living and/or activity space is required by law not to exceed a certain value Amax. Therefore, it is necessary to set the target carbon dioxide concentration $\xi(\xi<\xi max)$ from the formula (15) as follows.

$$\xi_o + \frac{B'L}{A'D'} < \xi \leq \xi_{max} \quad (17)$$

If the area A' of the gas exchange membrane is set as follows so as to satisfy the formula (17), the carbon dioxide concentration inside the living and/or activity space does not exceed the value required by law and safety of persons who act inside the living and/or activity space is ensured.

$$A' > \frac{B'L}{(\xi - \xi_o)D'} \quad (18)$$

Suppose that the target carbon dioxide concentration is set to be $\xi(\xi \leq \xi max$ is satisfied). When persons act to a certain extent inside the living and/or activity space, they act not to exceed the target carbon dioxide $\xi$. Obtained from the formula (18) is a guiding principle that the smaller the generation amount of carbon dioxide is, the thinner the gas exchange membrane is and the larger the diffusion constant of carbon dioxide molecule is, the smaller the necessary area A is. The formula (18) is transformed as follows.

$$\frac{V/A'}{D'/L} \leq \frac{(\xi - \xi_o)V}{B'}[s] \quad (19)$$

The numerator of the left side is determined only by the shape of the living and/or activity space (the aspect ratio of the living and/or activity space), while the denominator of the left side is determined by the property of the gas exchange membrane. The left side, i.e., the ratio of the numerator and the denominator that are distinctly distinguished determines time constant of the response. It is understood from the formula (19) that the larger the carbon dioxide generation rate is, the response time must be small (i.e., prompt response is necessary). With respect to the left side of the formula (19), any combination of (V, A', D', L) giving the same value has the same response time as the living and/or activity space although each value of V, A', D', L is different. According to the scaling rule, it is possible to design the highly clean system for any living and/or activity space.

There are some standards that give the carbon dioxide concentration to be obeyed. For example, according to the management standard of environment and hygiene of building the carbon dioxide concentration is desired to be not higher than 1000 ppm, while according to the standard of environment and hygiene of school the carbon dioxide concentration is desired to be not higher than 1500 ppm. However, it has been reported that the carbon dioxide concentration of real rooms of school may reach 2500 ppm~3000 ppm depending on the situation(it is pointed out that although life is not in danger, pupils may become absent-minded or concentration of pupils becomes weak). Hygienic limit value is 5000 ppm. With respect to oxygen, the concentration is required to be preferably between 20 and 30% for the standard concentration of 20.9%, while the value of 18.5% is given as the value that does not cause problems concerning health and activity. Therefore, it is understood from arrangement of concentration variables in the inequality (18) that when the area of the gas exchange membrane is determined so as to satisfy the above standard concentration, the area necessary to obey the carbon dioxide concentration is larger by about one digit than the area necessary to obey the oxygen concentration. Therefore, in order to enhance gas exchange ability, especially in exhaustion of carbon dioxide to the outside from the inside of the room, it is effective to use the stacking structure of many gas exchange membranes shown in FIG. 3~FIG. 6 described later as a core and to set so that gas components of air inside the room (inside air) and outside air can be exchanged by diffusion by the concentration gradient through the gas exchange membrane while preventing direct mixing of an air current. Diffusion constants of oxygen and carbon dioxide in air are about $1.7\times10^{-5}$ m$^2$/s and about $1.6\times10^{-5}$ m$^2$/s, respectively. It is not practical to make the concentration of the living and/or activity space having size of order of several meters constant by only diffusion because it takes dozens of hours. In order to perform gas exchange efficiently and thereafter make uniform the gas concentration inside the living and/or activity space promptly, it is preferable to attach two fans to the gas exchange device and produce the flow of outside air and the flow of inside air returned to the inside of the room after gas exchange intentionally. Flow rate is generally set to be 0.1~several hundred m$^3$/min depending on size of the living and/or activity space. The interval (width) between the gas exchange membranes on both sides of the space in which inside air flows and the interval (width) between the gas exchange membranes on both sides of the space in which outside air flows are selected as necessary. For example, the interval between the gas exchange membranes of the space in which inside air flows can be adjusted to be small so as to shorten time necessary for gas exchange and the interval between the gas exchange membranes of the space in which outside air flows can be set to be larger than that. According to such an asymmetric establishment of the intervals of the gas exchange membranes, it is hoped that concentration of components after gas exchange can be locally brought close to the concentration of outside air through the volume ratio. When the flow rate of the fans is sufficiently large, symmetric establishment of the interval of the gas exchange membranes is convincing for symmetry and stability of the system as a whole because the fans can be set symmetrically for inside air and outside air.

From the above description, it is apparent that following inventions of building and method for controlling gas molecule concentration in living and/or activity space in building can be derived. That is, according to the invention, there is provided a building comprising:

at least one room, the room having inside a living and/or activity space that is an enclosed space, if performing ventilation of an air flow F from the outside to the living and/or activity space, assuming that the volume of the living and/or activity space is denoted as V, the gas consumption amount inside the living and/or activity space is denoted as B(m³/s), the gas concentration inside the living and/or activity space at time t is denoted as η(t), and the gas concentration of the outside is denoted as η0, η(t) being given as follows when air inside the living and/or activity space is sufficiently agitated and the concentration of respective gas molecules constituting the air is made spatially uniform:

$$\eta(t) = \eta_o - \frac{B}{F}(1 - \exp(-Ft/V)) \qquad (3)$$

eliminating entering/exiting of air as an air current between the inside of the living and/or activity space and the outside, and at least a part of the boundary between the living and/or activity space and the outside being configured from a membrane not passing through dust particles but passing through gas molecules having the diffusion constant D, the thickness L, and the area A for gas molecules of interest, η(t) being controlled so as to vary according to the following formula when air inside the living and/or activity space is sufficiently agitated and the concentration of respective gas molecules constituting the air is made spatially uniform:

$$\eta(t) = \eta_o - \frac{BL}{AD}(1 - \exp(-[AD/L]t/V)) \qquad (9)$$

further the area A of the membrane being set so as to satisfy

A≥FL/D between F and the area A of the membrane where F is ventilation air flow required by law or other reasons.

Furthermore, according to the invention, there is provided a method for controlling gas molecule concentration in living and/or activity space in building, the building comprising at least one room, the room having inside a living and/or activity space that is an enclosed space, if performing ventilation of an air flow F from the outside to the living and/or activity space, assuming that the volume of the living and/or activity space is denoted as V, the gas consumption amount inside the living and/or activity space is denoted as B(m³/s), the gas concentration inside the living and/or activity space at time t is denoted as η(t), and the gas concentration of the outside is denoted as η0, η(t) being given as follows when air inside the living and/or activity space is sufficiently agitated and the concentration of respective gas molecules constituting the air is made spatially uniform:

$$\eta(t) = \eta_o - \frac{B}{F}(1 - \exp(-Ft/V)) \qquad (3)$$

eliminating entering/exiting of air as an air current between the inside of the living and/or activity space and the outside, and at least a part of the boundary between the living and/or activity space and the outside being configured from a membrane not passing through dust particles but passing through gas molecules having the diffusion constant D, the thickness L, and the area A for gas molecules of interest, η(t) being controlled so as to vary according to the following formula when air inside the living and/or activity space is sufficiently agitated and the concentration of respective gas molecules constituting the air is made spatially uniform:

$$\eta(t) = \eta_o - \frac{BL}{AD}(1 - \exp(-[AD/L]t/V)) \qquad (9)$$

further the area A of the membrane being set so as to satisfy

A≥FL/D between F and the area A of the membrane where F is ventilation air flow required by law or other reasons, thereby keeping the quality of air inside the living and/or activity space well while eliminating entering/exiting of air as an air current between the inside of the living and/or activity space and the outside.

In the inventions, typically, with respect to the gas molecules of interest, the gas molecules are exchanged between the inside of the living and/or activity space and the outside only when there exists difference in their concentration between the inside of the living and/or activity space and the outside, or further, when air environment inside the living and/or activity space is controlled, gas molecules other than the gas molecules of interest that exist outside the living and/or activity space are not exchanged.

Effect of the Invention

According to the invention, it is possible to obtain the same effect as a case where ventilation of flow rate F is performed effectively through diffusion of gas molecules without exchanging gases between the inside of the living and/or activity space and the outside (although the flow rate of exchange of an air current between the inside and the outside F=0). That is, it is possible to give quantitatively the area of the gas exchange membrane necessary to obey at least the concentration of gases that is determined by law or the concentration of gases that is determined by other reasons. In addition to this, by using the 100% circulation feedback system using the air circulation performance of the air conditioner, it is possible to realize a gas environment inside the highly clean room while securing sure and safety of persons(operators, pupils applying themselves to their studies, etc.) who act inside the room.

MODES FOR CARRYING OUT THE INVENTION

Modes for carrying out the invention (hereafter referred as "embodiments") will now be explained below.

1. The First Embodiment

Figure 1:
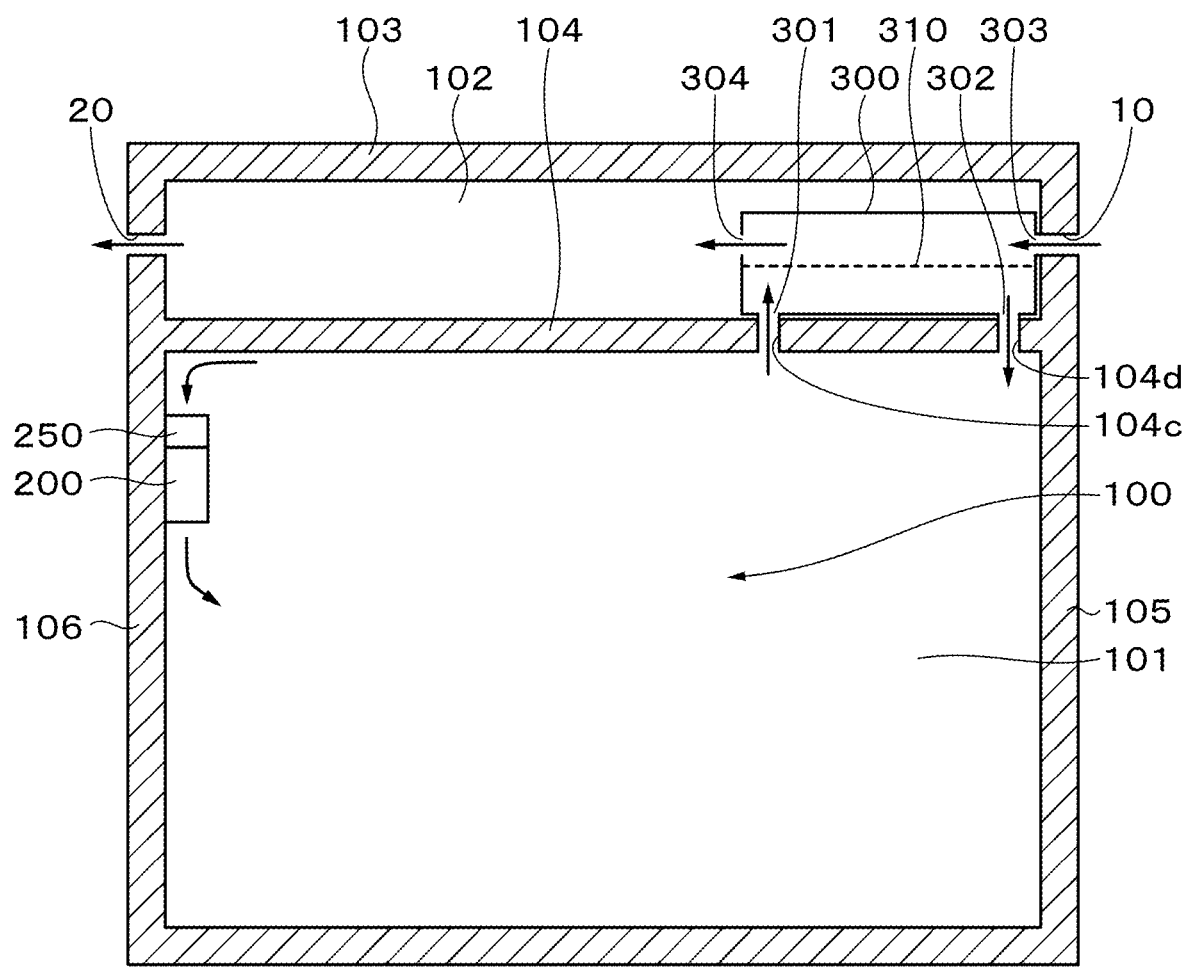
FIG. 1 A cross sectional view showing a building according to the first embodiment.

FIG. 1 shows a building according to the first embodiment. Although the building has generally a plurality of rooms, only one room is shown in FIG. 1. As shown in FIG. 1, the building has a room 100 with high airtightness except for an air supply opening 10 and an air exhaustion opening 20. The room 100 forms an enclosed space. The shape of the room 100 is determined as necessary. The shape of the room 100 is, for example, a rectangular parallelepiped shape with a rectangular planar shape, a shape with a planar shape of a concave hexagonal shape(or L-shape) that is obtained by truncating one corner rectangular region of the rectangular planar shape, a shape with a U-shape planar shape, a shape in which all or a part of walls of these rooms is curved, etc. The room 100 has a living and/or activity space(hereafter referred as "living etc. space") 101 and a space 102 between the roof and the ceiling as subspaces constituting the enclosed space. The space 102 between the roof and the ceiling is an internal space formed by the double ceiling. The double ceiling is constituted by the top surface 103 of the room 100 and a ceiling wall 104 formed so as to face the top surface 103 a constant distance apart. That is, the living etc. space 101 and the space 102 between the roof and the ceiling are separated by the ceiling wall 104. The living etc. space 101 is a space in which one or more persons lives, works, has a meeting, etc. therein and has the necessary size. The room has a window or a door for going in and out of persons, though their illustration and description are omitted.

Figure 2:
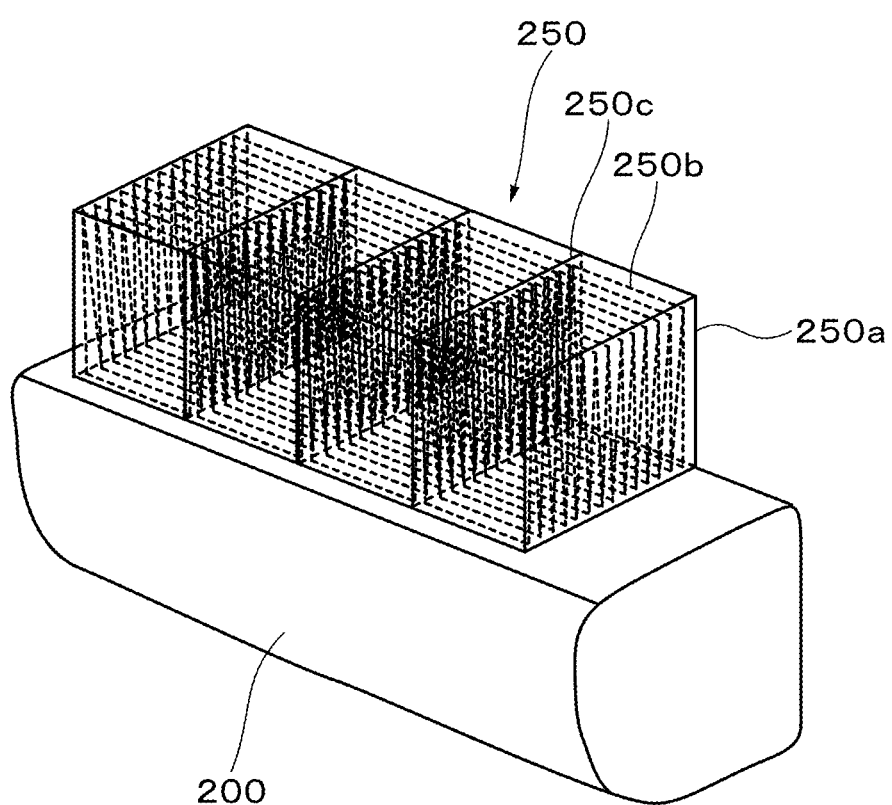
FIG. 2 A perspective view showing an air conditioner installed on the wall of the living etc. space of a room of the building according to the first embodiment and a prefilter attached to an air absorption opening of the air conditioner.
Figure 3:
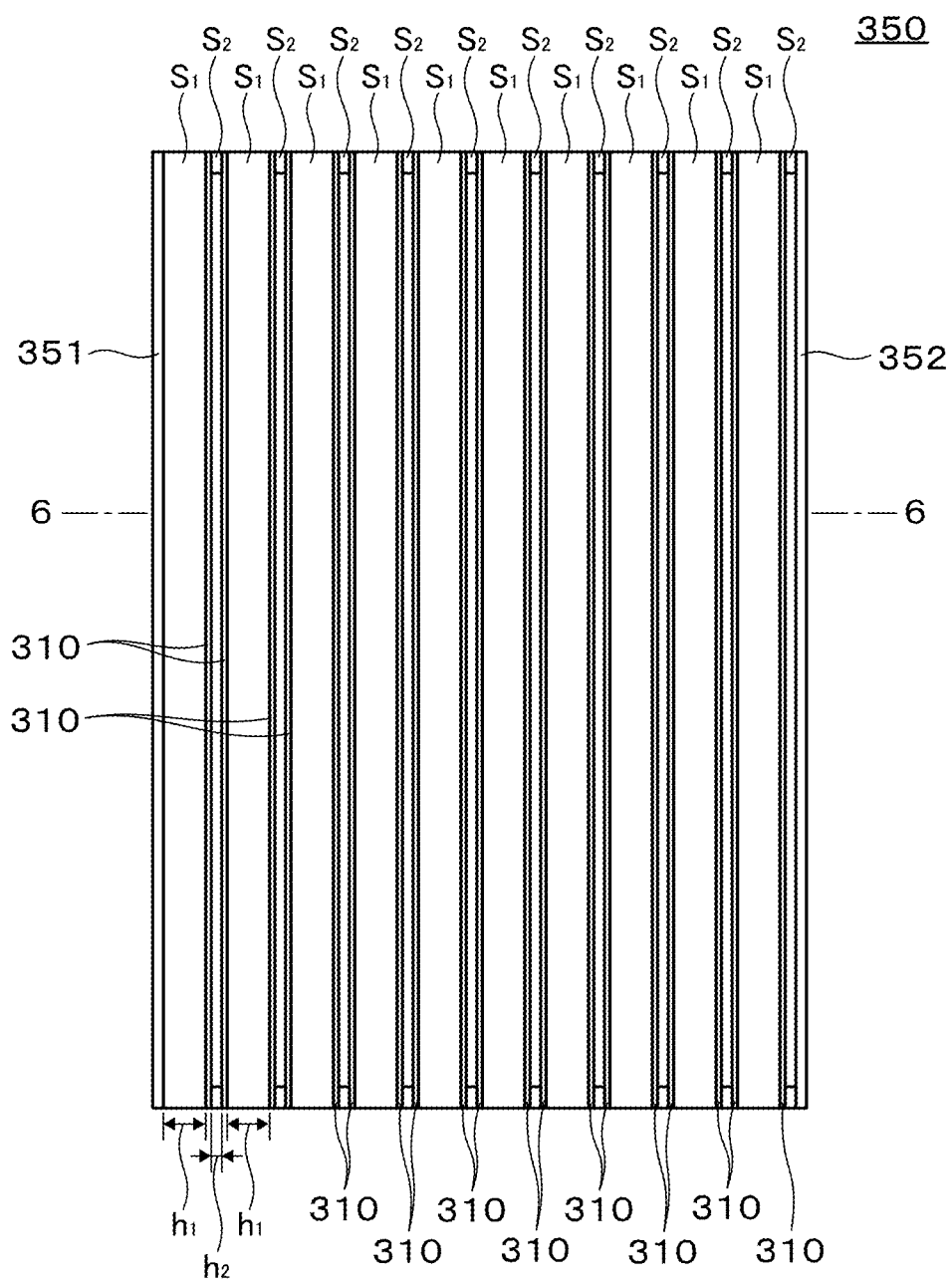
FIG. 3 A top view showing an example of the box-like structure of the gas exchange device that is used in the building according to the first embodiment.
Figure 4:
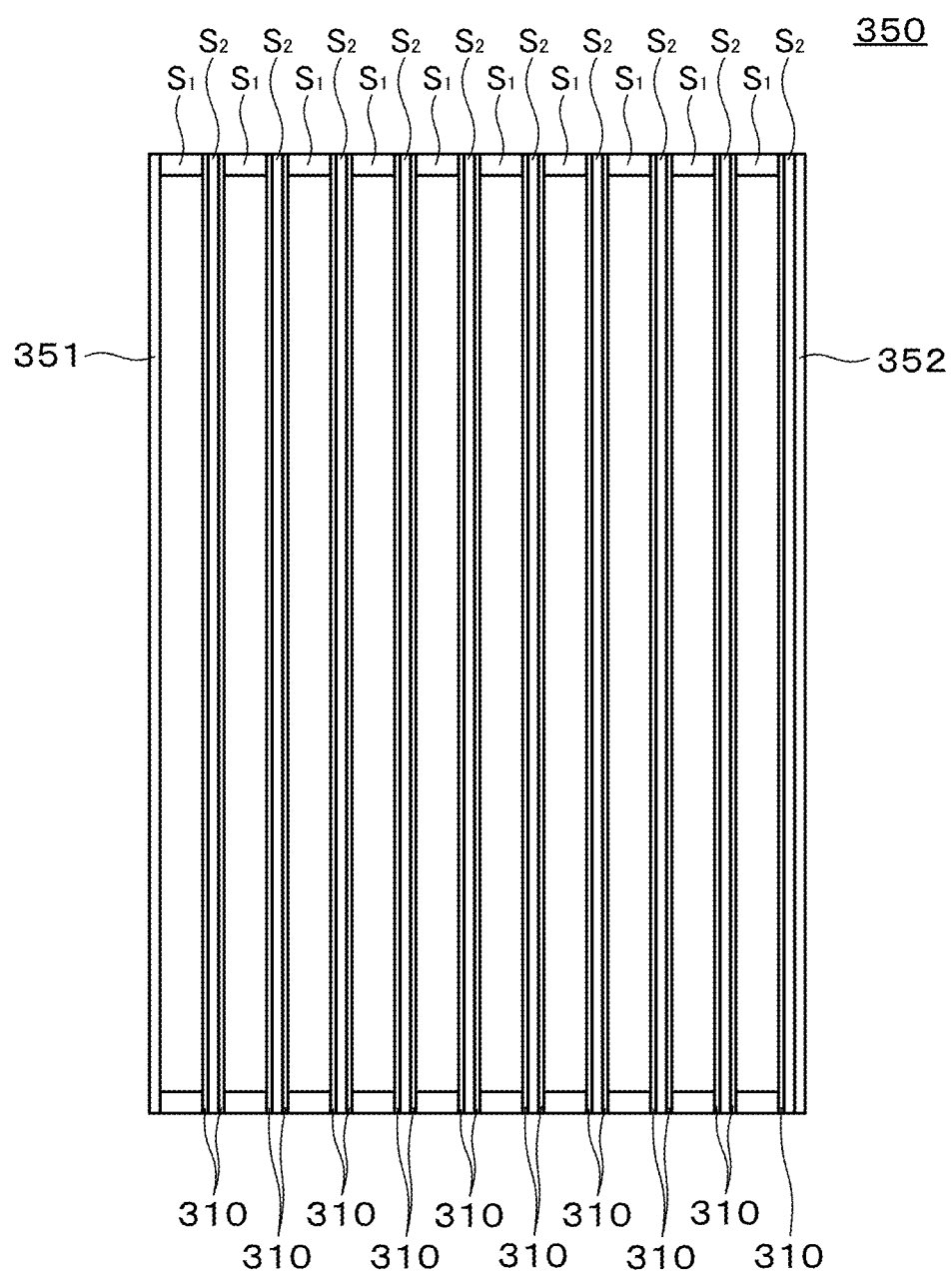
FIG. 4 A front view showing the example of the box-like structure of the gas exchange device that is used in the building according to the first embodiment.
Figure 5:
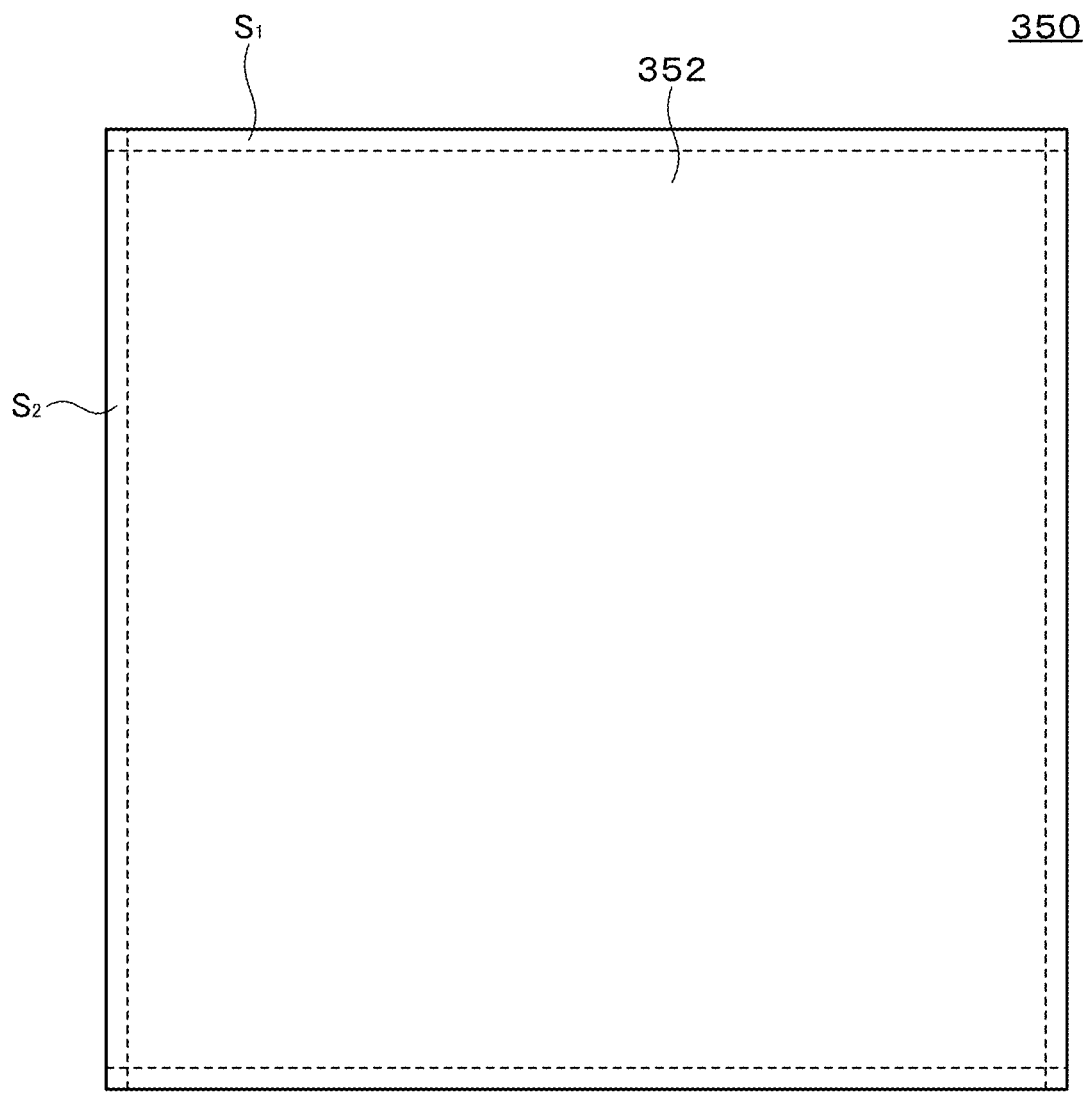
FIG. 5 A side view showing the example of the box-like structure of the gas exchange device that is used in the building according to the first embodiment.
Figure 6:
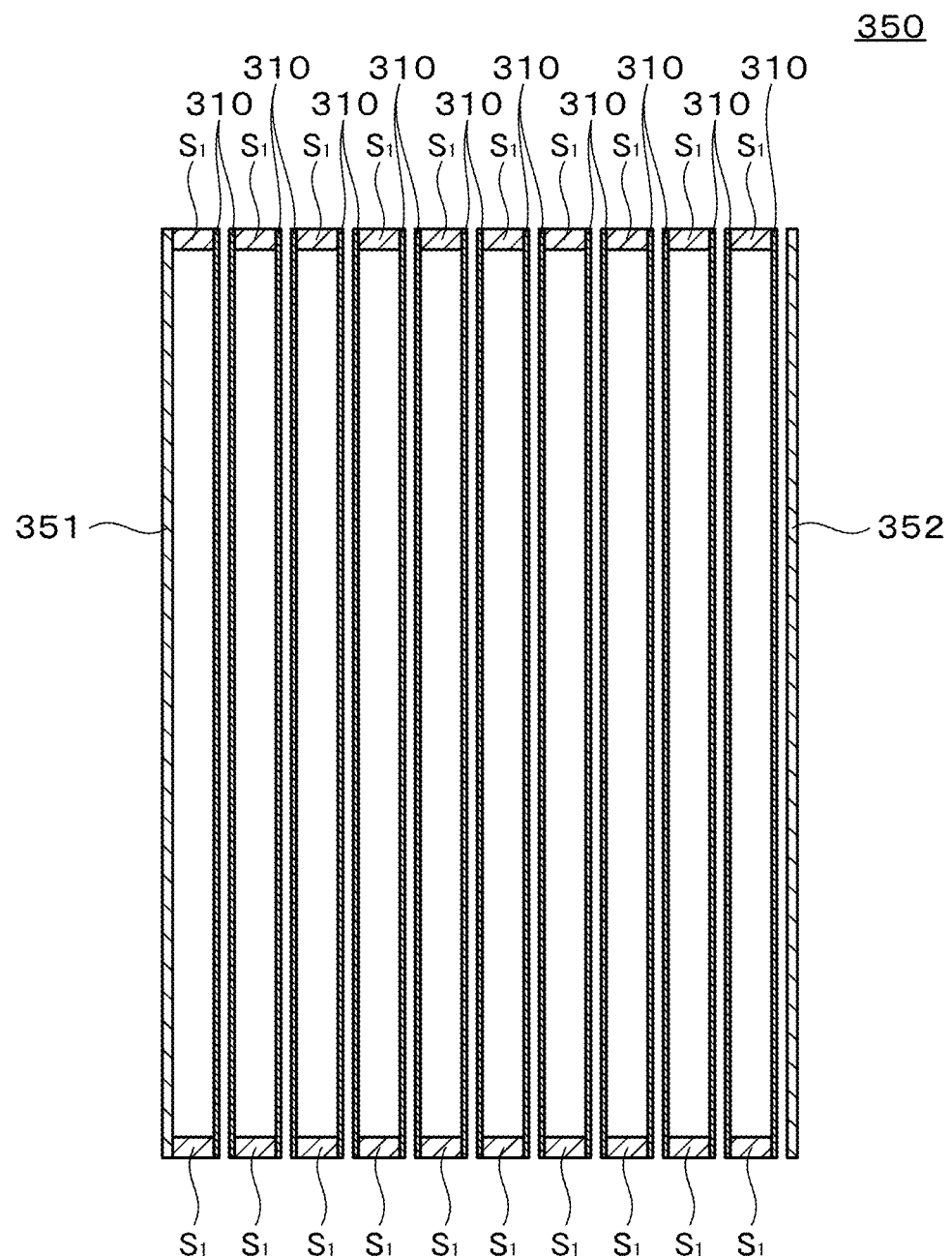
FIG. 6 A cross sectional view along 6-6 line of FIG. 3.

A wall-mounted air conditioner 200 is installed on the wall of a sidewall 106 of the living etc. space 101. A rectangular parallelepiped prefilter 250 made of a medium performance filter is attached to an air absorption opening of the top of the air conditioner 200. FIG. 2 shows a perspective view of the air conditioner 200 installed on the wall and the prefilter 250 thereon. The prefilter 250 is made of filter material 250b such as shoji paper etc. put in a box 250a with open base and top, the filter material 250b being folded repeatedly to form mountain-shape and valley-shape. Shown in FIG. 2 as an example is a case where the inside of the box 250a is divided into four spaces by partition boards 250c and the filter material 250b such as shoji paper etc. that form mountain-shape and valley-shape is put in each space with the same direction, but not limited to this, and form and placing method of the filter material 250b may be selected as necessary. Preferably, a mesh-like cover is attached to the top of the prefilter 250 so as to prevent large dusts falling on the filter material 250b. In the cover, openings are formed with the size, number and arrangement so as not to reduce ventilation conductance too much. Air inside the living etc. space 101 is absorbed into the inside of the prefilter 250 from the top of the prefilter 250, then air that is filtered and cleaned by the filter material 250b enters into the inside of the air conditioner 200 from the air absorption opening, and is finally blown out into the inside of the living etc. space 101 from a ventilation opening of the lower part of the air conditioner 200. In this case, in the inside of the living etc. space 101, all of air sent out from the ventilation opening of the air conditioner 200 is returned to the top of the prefilter 250. That is, the 100% circulation feedback system is constituted.

On the other hand, a gas exchange device 300 is installed on the ceiling wall 104. Openings 104c, 104d are formed in parts of the ceiling wall 104 corresponding to an inside air collection opening 301 and a return opening 302, respectively. An outside air introduction opening 303 of the gas exchange device 300 is connected to an air supply opening 10 formed in a sidewall 105 of the room 100, if necessary through a duct. An exhaustion opening 304 of the gas exchange device 300 is connected to an air exhaustion opening 20 formed in the sidewall 106, if necessary through a duct. The inside air collection opening 301 of the gas exchange device 300 is connected to the opening 104c formed in the ceiling wall 104, if necessary through a duct. The return opening 302 of the gas exchange device 300 is connected to the opening 104d formed in the ceiling wall 104, if necessary through a duct. At least one gas exchange membrane 310 is enclosed in the gas exchange part inside the gas exchange device 300. Air inside the living etc. space 101 is introduced into one space of the gas exchange part separated by the gas exchange membrane 310 through the opening 104c formed in the ceiling wall 104 and the inside air collection opening 301 of the gas exchange device 300 and outside air is introduced into the other space of the gas exchange part separated by the gas exchange membrane 310 through the air supply opening 10 formed in the sidewall 105 and the outside air introduction opening 303 of the gas exchange device 300. And oxygen in the outside air is introduced into the one space through the gas exchange membrane 310 and carbon dioxide in the inside air introduced into the one space is introduced into the other space through the gas exchange membrane 310 in the direction opposite to that of oxygen. In this way, the inside air supplied with oxygen from the outside air is returned to the living etc. space 101 from the return opening 302 of the gas exchange device 300. The outside air supplied with carbon dioxide from the inside air is exhausted outside from the exhaustion opening 304 of the gas exchange device 300 and the air exhaustion opening 20 formed in the sidewall 106.

Figure 7A:
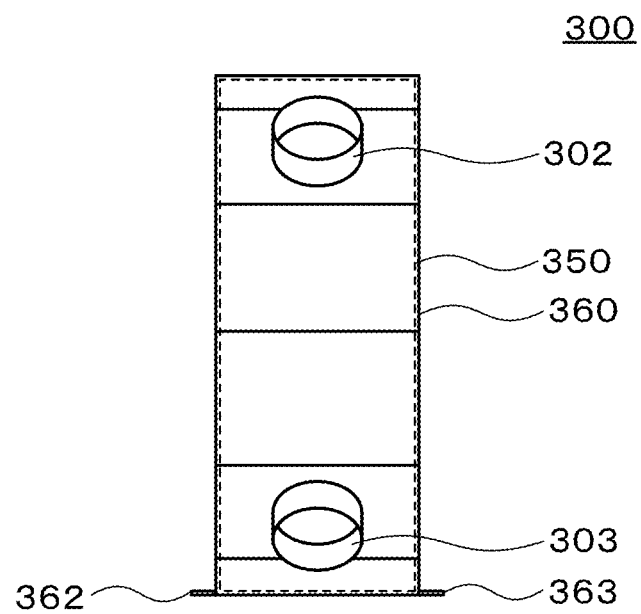
FIG. 7A A front view showing an example of the gas exchange device that is used in the building according to the first embodiment.
Figure 7B:
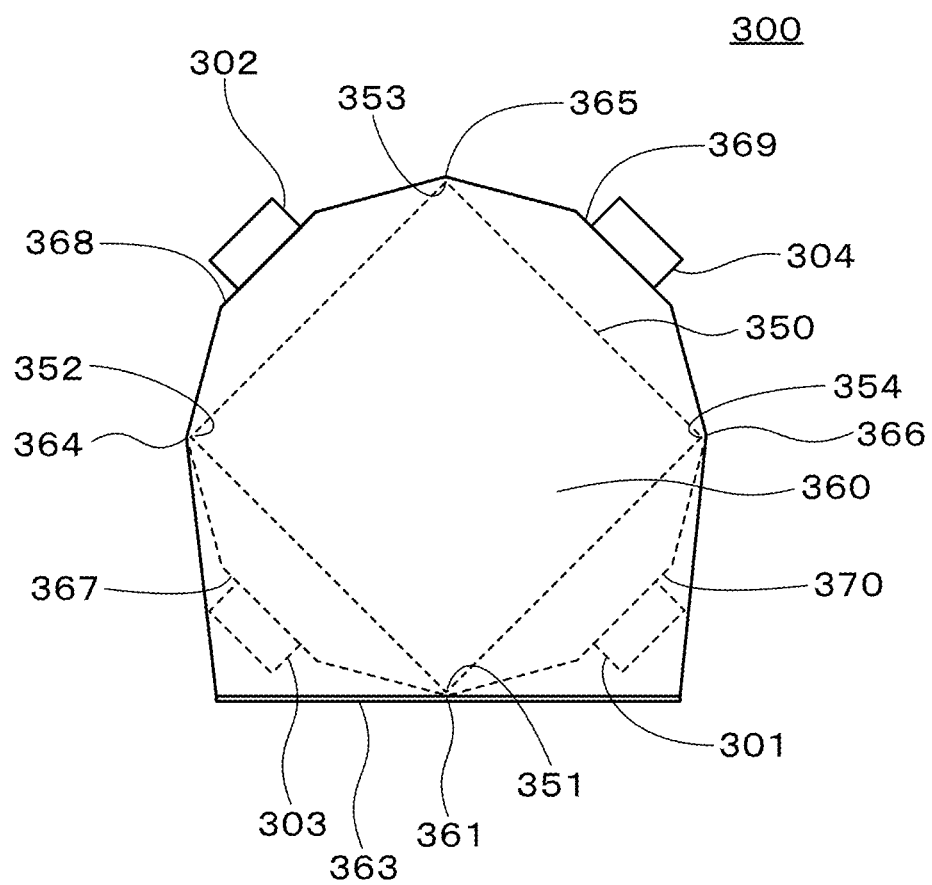
FIG. 7B A side view showing the example of the gas exchange device that is used in the building according to the first embodiment.

The gas exchange device 300 is concretely constituted, for example, as follows. FIG. 3~FIG. 6 show an example of the structure of the gas exchange part 350 inside the gas exchange device 300. Here, FIG. 3~FIG. 6 are top view, front view, side view and cross sectional view along 6-6 line of FIG. 3 of the gas exchange part 350, respectively. FIG. 7A and FIG. 7B are front view and side view of the gas exchange device 300, respectively.

As shown in FIG. 3~FIG. 6, the gas exchange part 350 is constituted as follows. That is, the gas exchange membrane 310 is put up on two spacers S1 with height of h1 having a rectangular cross section formed on one plane of a square flat board 351 along two sides opposite to each other. Stacked on the gas exchange membrane 310 are spacers S2 with height of h2 having a rectangular cross section formed on parts corresponding to two sides opposite to each other lying at right angles to the spacers S1, on which the gas exchange membrane 310 is put up. Stacked on the gas exchange membrane 310 are spacers S1 on which the gas exchange membrane 310 is put up. Similarly, the spacers S2 on which the gas exchange membrane 310 is put up and the spacers S1 on which the gas exchange membrane 310 is put up are stacked alternately and repeatedly. On the last spacers S1 on which the gas exchange membrane 310 is put up, two spacers S2 with height of h2 having a rectangular cross section formed on one plane of a flat board 352 of the same shape as the flat board 351 along two sides opposite to each other are formed, laying the spacers S2 down. In this example, a total of 19 sheets of the gas exchange membrane 310 is formed. The total area of the gas exchange membrane 310 included in the gas exchange part 350 is determined so as to satisfy the formula (18) or A≥FL/D, or determined to be not less than MAX(Amin, A'min). Since the gas exchange membrane 310 is very thin, if its thickness is ignored, the interval between the two gas exchange membranes 310 separated by the spacers S2 is about h2 and the interval between the two gas exchange membranes 310 separated by the spacers S1 is about h1. The space between the two gas exchange membranes 310 separated by the spacers S2 is a space for passing inside air and the space between two gas exchange membranes 310 separated by the spacers S1 is a space for passing outside air. The direction along which outside air flows and the direction along which inside air flows lie each other nearly at right angles. h1, h2 are selected as necessary. In order to perform exchange of carbon dioxide in inside air and oxygen in outside air efficiently through the gas exchange membranes 310, it is desired that the introduction amount of outside air is set to be larger than the introduction amount of inside air relatively. Therefore, generally, it is determined to be h1≥h2, preferably h1>h2. In the gas exchange part 350 shown in FIG. 3~FIG. 6, a case of h1>h2 is shown. More specifically, it is selected to be, for example, h1≈(2~7)×h2. For example, h1=25 mm, h2=5 mm. When h1 and h2 are different each other, it is preferable to set the shape of the gas exchange part 350 of FIG. 4 to be a rectangle in which the aspect ratio is set in the direction so as to equalize ventilation conductances of outside air and inside air according to the ratio of h1 and h2.

As shown in FIG. 7A and FIG. 7B, the gas exchange device 300 has an enclosure 360, which main body has a shape like a dodecahedron. Both sides of the enclosure 360 spread in one direction from the base and the upper base of the dodecahedron and forms a nonagon in which one side passing on one mountain ridge 361 of the enclosure 360 is sufficiently longer than other sides. Formed on long sides passing the mountain ridges 361 of both sides of the enclosure 360 are thin long support parts 362, 363 projecting perpendicularly to the both sides and elongating along the long sides of the enclosure 360. When the gas exchange device 300 is fixed, it is fixed to the installation place by threading bolts through holes (not illustrated) formed in a plurality of places of the support parts 362, 363. The box-like gas exchange part 350 is enclosed in the enclosure 360. The flat boards 351, 352 on the both sides of the gas exchange part 350 are almost in contact with the both sides of the enclosure 360 and mountain ridges 351~354 on the corner of the gas exchange part 350 match the mountain ridges 361, 364~366 of the enclosure 360, respectively. Therefore, the gas exchange part 350 is enclosed in the enclosure 360 so that the gas exchange part 350 hardly moves. When the gas exchange device 300 is fixed, the gas exchange membrane 310 is vertical. Therefore, even though dusts enter the space between the two gas exchange membranes 310 facing each other, they fall naturally. As a result, it is possible to prevent the gas exchange performance from lowering due to generation of clogging up by piling up of dusts on the surface of the gas exchange membrane 310.

Cylindrical outside air introduction opening 303, return opening 304, exhaustion opening 304 and inside air collection opening 301 are formed on four sides 367~370 of the enclosure 360, respectively. In this case, outside air introduced from the outside air introduction opening 303 passes through the space between the two gas exchange membranes 310 separated by the spacers S1 and then exhausted from the exhaustion opening 304. Inside air introduced from the inside air collection opening 301 passes through the space between the two gas exchange membranes 310 separated by the spacers S2 and then exhausted from the return opening 302.

According to the first embodiment, since the total area A' of the gas exchange membranes 310 included in the gas exchange part 350 is determined so as to satisfy the formula (18), it is possible to keep the carbon dioxide concentration as well as the oxygen concentration at a level required by law or other reasons. In addition to this, although the room 100 is an general room in which the wall-mounted air conditioner 200 is installed on the wall, it is possible to make the living etc. space 101 a clean space with cleanliness not less than, for example, class 100by the 100% circulation feedback system by only attaching the prefilter 250 that is the medium performance filter to the gas absorption opening of the air conditioner 200. Furthermore, since the prefilter 250 is the medium performance filter, its clogging up is hard to occur after it is used for a long time. Therefore, the lifetime of the prefilter 250 is very long, so that it is possible to lower frequency of exchange of it remarkably. The building is preferably used for, for example, schools in foreign countries in which air environment is hard to say well as well as hospitals, public facilities and general homes in Japan.

2. The Second Embodiment

Figure 8:
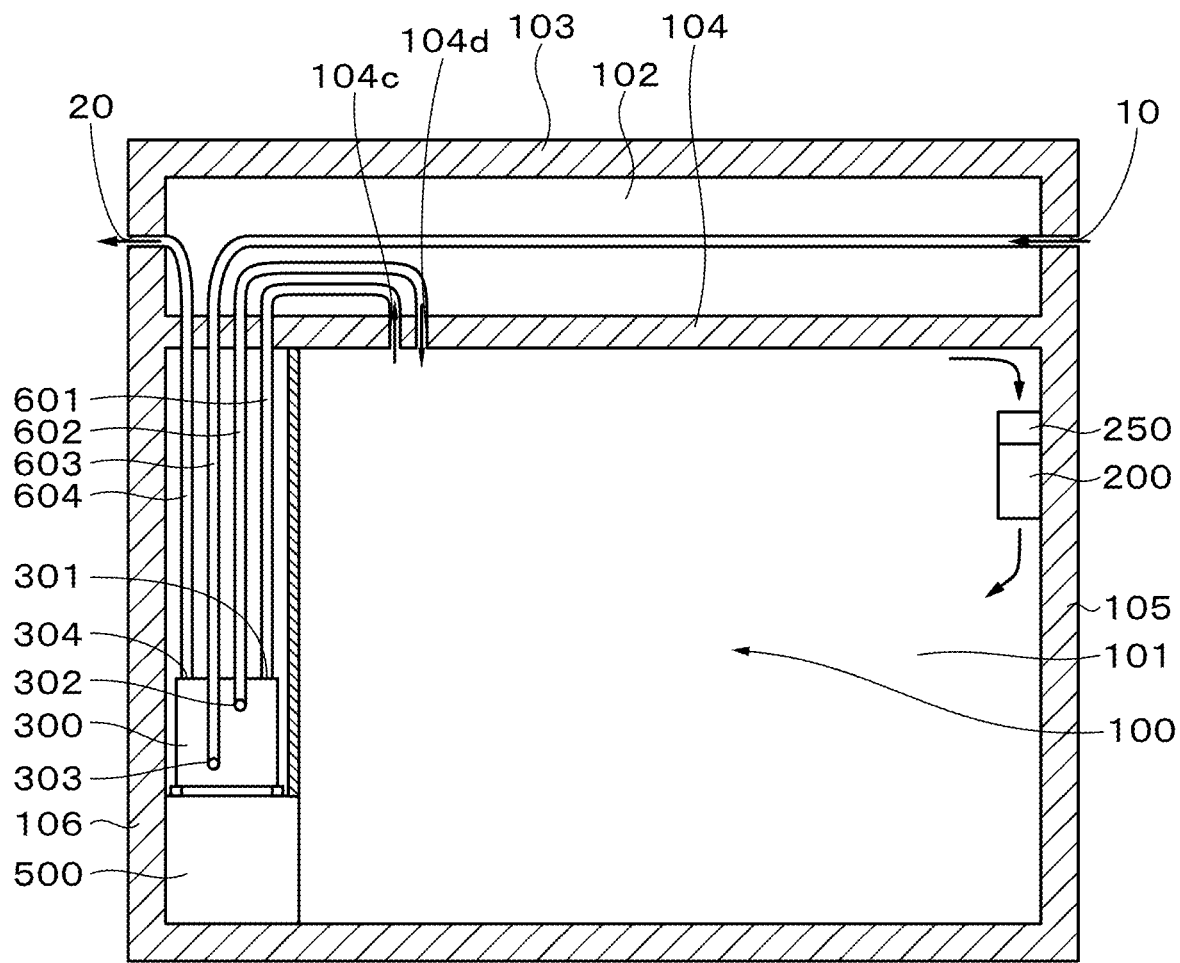
FIG. 8 A cross sectional view showing a building according to the second embodiment.
Figure 9:
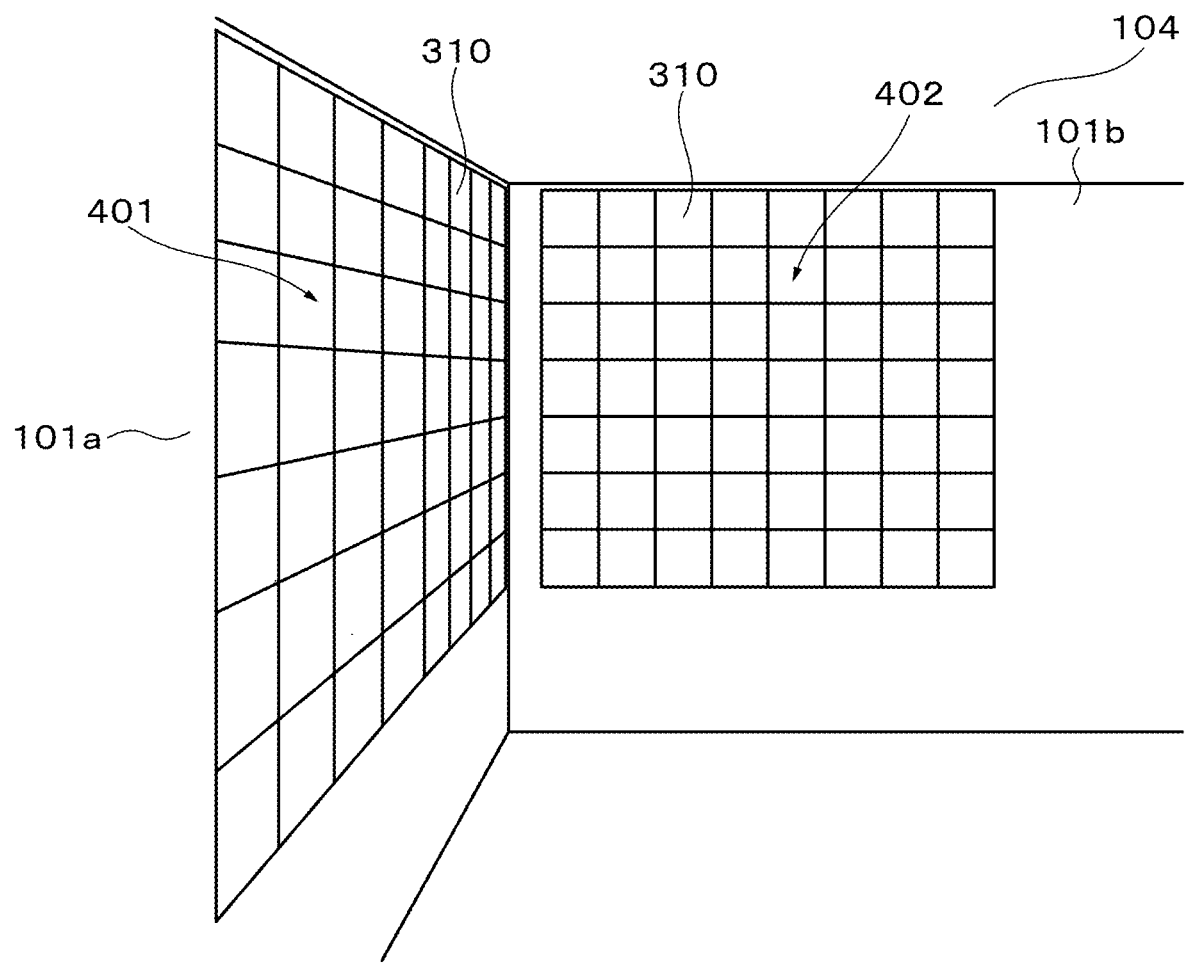
FIG. 9 A perspective view showing two walls crossing each other of the living etc. space of the room of the building according to the second embodiment seen from the inside of the living etc. space.
Figure 10:
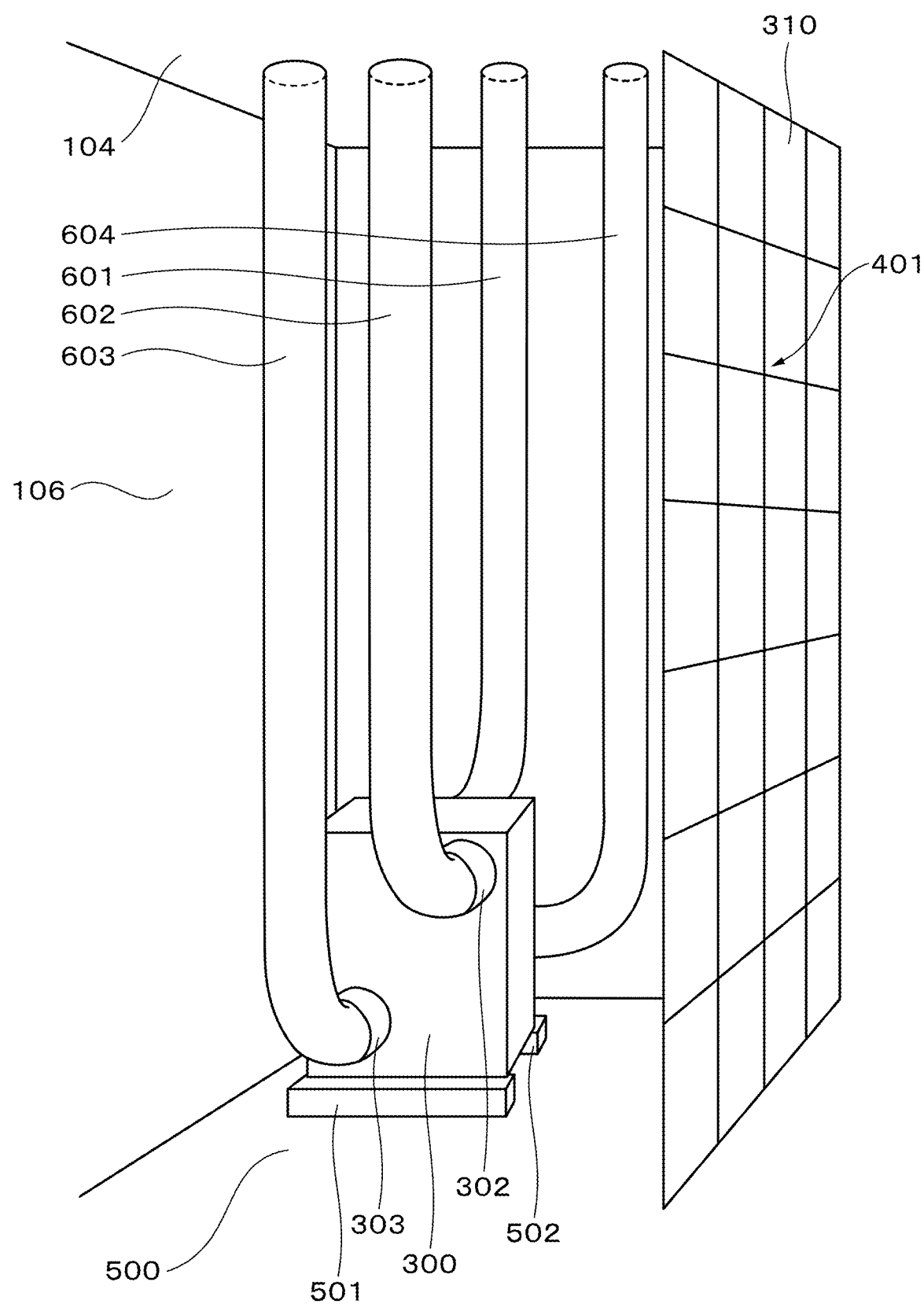
FIG. 10 A perspective view showing the state where the gas exchange device 300 is installed in a space behind one wall of the living etc. space of the room of the building according to the second embodiment.
Figure 11:
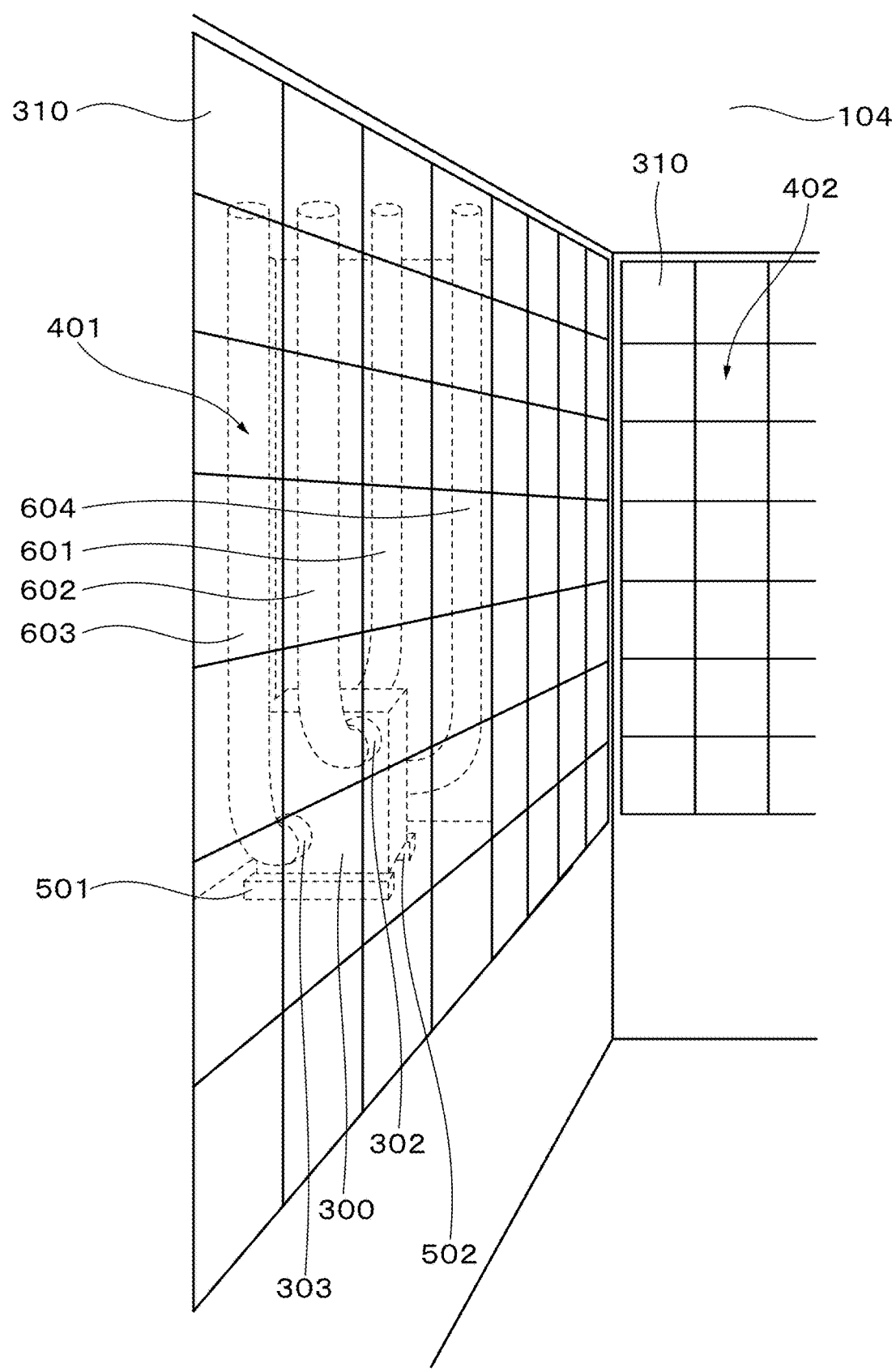
FIG. 11 A perspective view showing two walls crossing each other of the living etc. space of the room of the building according to the second embodiment seen from the inside of the living etc. space.

FIG. 8 shows a building according to the second embodiment. As the same as the first embodiment, only one room is shown in FIG. 8. As shown in FIG. 8, the building has the room 100 with high airtightness except for the air supply opening 10 and the air exhaustion opening 20. As the same as the first embodiment, the wall-mounted air conditioner 200 is installed on the sidewall 105 of the living etc. space 101 and the rectangular parallelepiped prefilter 250 made of the medium performance filter is attached to the air absorption opening of the top of the air conditioner 200. FIG. 9 shows a perspective view of two walls 101a, 101b crossing each other seen from the inside of the living etc. space 101. As shown in FIG. 9, shojis 401, 402 are attached to the walls 101a, 101b. The gas exchange membrane 310 is used as shoji paper of the shojis 401, 402. The gas exchange device 300 is installed in a space behind the shoji 401, not on the ceiling wall 104, which is different from the first embodiment. FIG. 10 shows a state where one side half of the shoji 401 is opened and FIG. 11 shows a state where the shoji 401 is shut. As shown in FIG. 10, the gas exchange device 300 is installed on a stand 500 in a space enclosed by the ceiling wall 104, the sidewall 106 of the room 100, the shoji 401 and the stand 500.

Figure 12A:
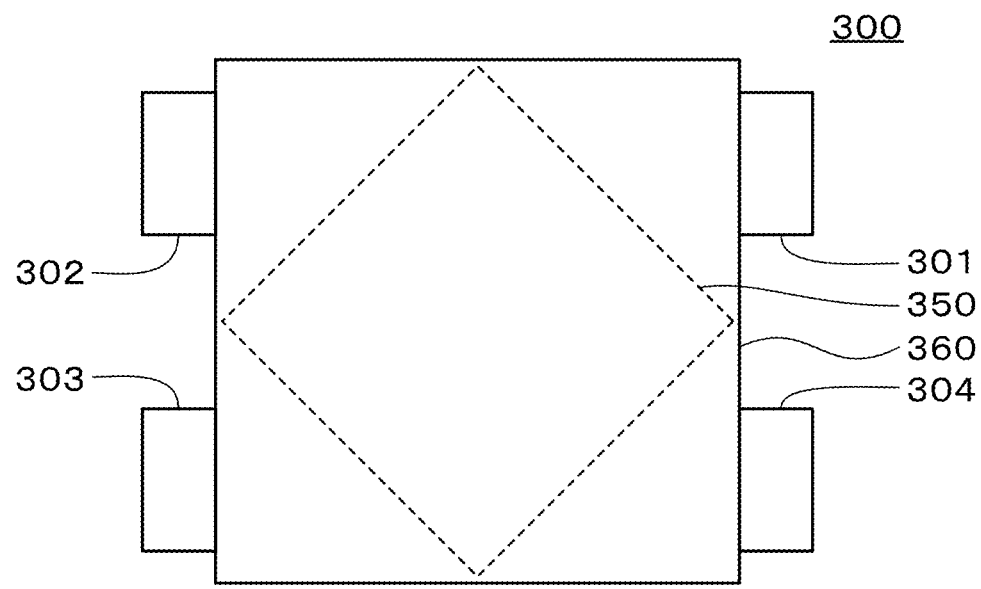
FIG. 12A A front view showing an example of the gas exchange device that is used in the building according to the second embodiment.
Figure 12B:
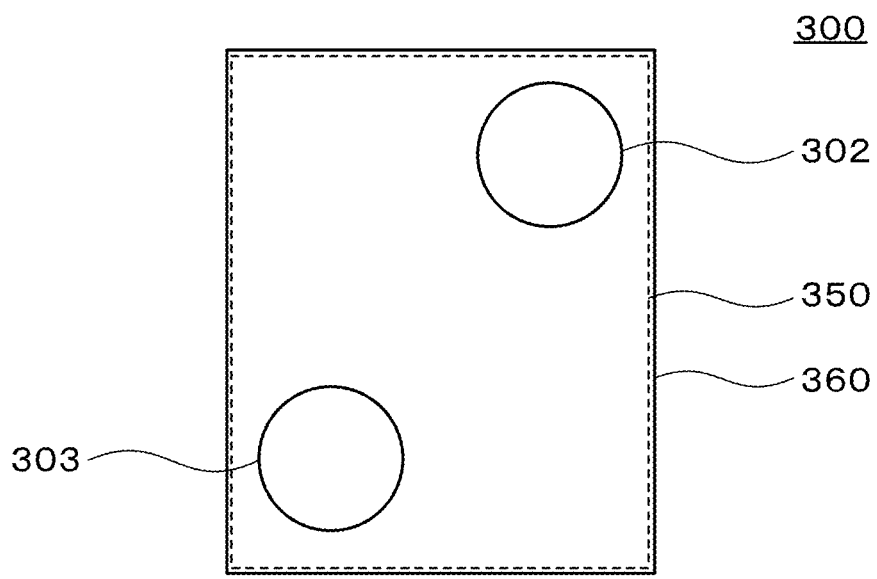
FIG. 12B A left side view showing the example of the gas exchange device that is used in the building according to the second embodiment.
Figure 12C:
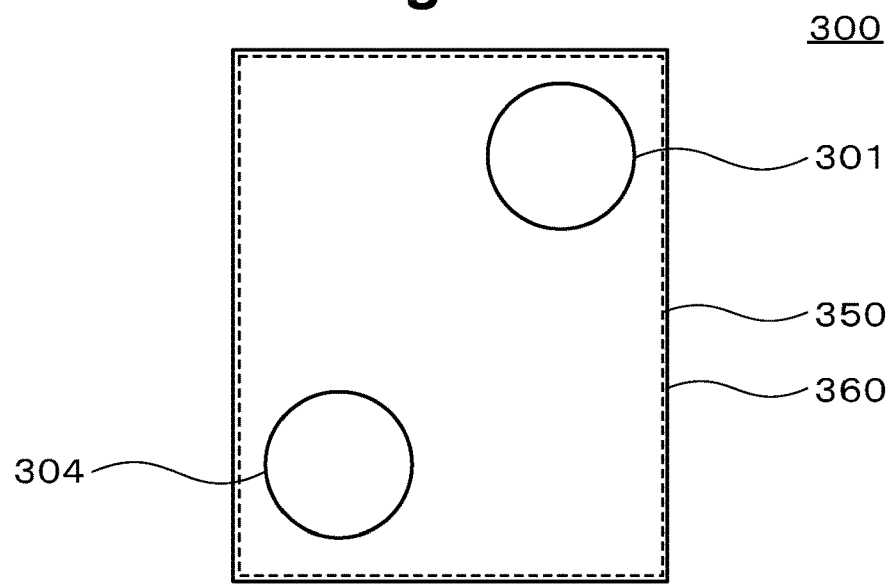
FIG. 12C A right side view showing the example of the gas exchange device that is used in the building according to the second embodiment.
Figure 13A:
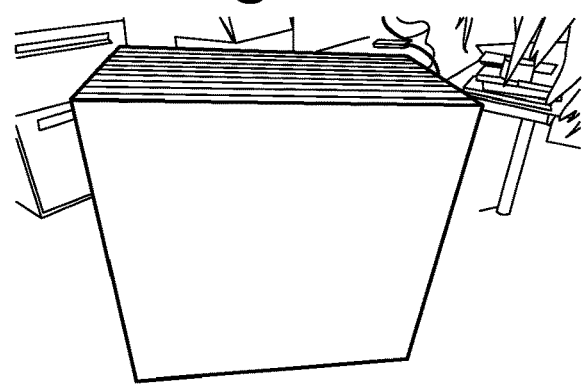
FIG. 13A A substitute picture for a drawing taken of mainly the side of a gas exchange part of the gas exchange device that was made in the example 1.
Figure 13B:
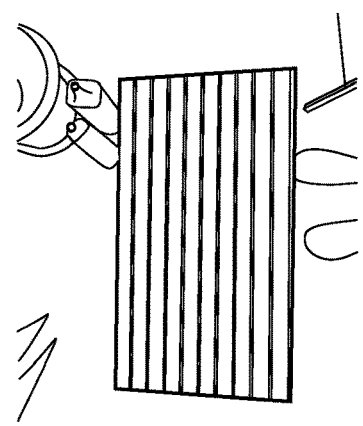
FIG. 13B A substitute picture for a drawing taken of the top of the gas exchange part of the gas exchange device that was made in the example 1.
Figure 13C:
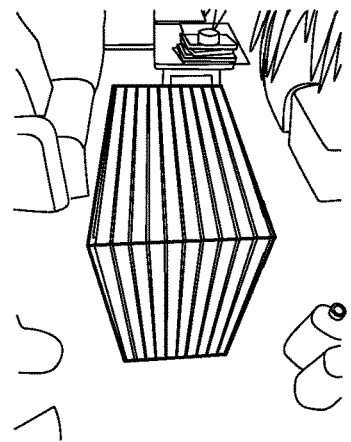
FIG. 13C A substitute picture for a drawing taken of the top and the side of the gas exchange part of the gas exchange device that was made in the example 1.
Figure 13D:
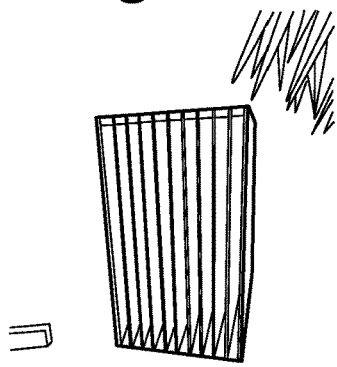
FIG. 13D A substitute picture for a drawing taken of the side of the gas exchange part of the gas exchange device that was made in the example 1.
Figure 13E:
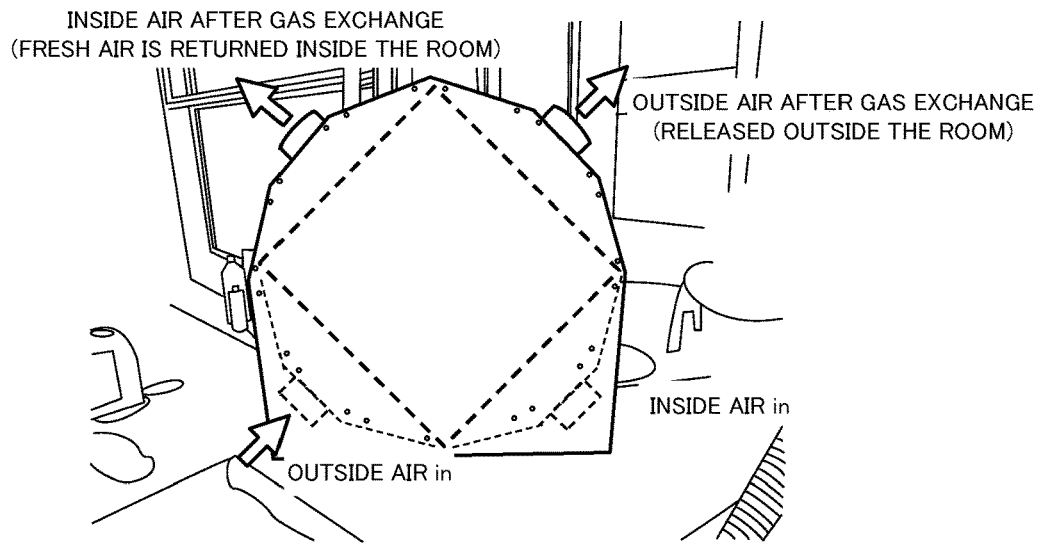
FIG. 13E A substitute picture for a drawing taken of the side of the gas exchange device that was made in the example 1.

The gas exchange device 300 is concretely constituted, for example, as shown in FIG. 12A, FIG. 12B and FIG. 12C. Here, FIG. 12A, FIG. 12B and FIG. 12C are front view, left side view and right side view of the gas exchange device 300, respectively. As shown in FIG. 12A, FIG. 12B and FIG. 12C, the gas exchange device 300 has the regular quadratic prism enclosure 360. The gas exchange part 350 shown in FIG. 3~FIG. 6 is enclosed inside the enclosure 360 in a state where the gas exchange part 350 is rotated by 45° for the enclosure 360. More specifically, the gas exchange part 350 is enclosed inside the enclosure 360 in a state where four mountain ridges of the gas exchange part 350 is inscribed with bisectors of each side of the enclosure 360. The cylindrical outside air introduction opening 303 and return opening 302 are formed in one side of the enclosure 360, respectively and the cylindrical exhaustion opening 304 and inside air collection opening 301 are formed in another side facing the one side.

As shown in FIG. 10, the gas exchange device 300 is fixed to two support parts 501, 502 that are fixed to a stand 500 by L-shape metal fittings (not illustrated), laying its one side in which the inside air collection opening 301, the return opening 302, the outside air introduction opening 303 and the exhaustion opening 304 are not formed down. Each one end of ducts 601, 602, 603, 604 is connected to the inside air collection opening 301, the return opening 302, the outside air introduction opening 303 and the exhaustion opening 304 of the gas exchange device 300, respectively. The other end of the ducts 601, 602, 603, 604 elongates upward to thread the ceiling wall 104, and further passes through the space 102 between the roof and the ceiling and is connected to the opening 104c formed in the ceiling wall 104, the opening 104d formed in the ceiling wall 104, the air supply opening 10 formed in the sidewall 105 and the air exhaustion opening 20 formed in the sidewall 106, respectively. When the gas exchange device 300 is fixed, the gas exchange membrane 310 is vertical. Therefore, even though dusts enter the space between the two gas exchange membranes 310 facing each other, they fall naturally. As a result, it is possible to prevent the gas exchange performance from lowering due to generation of clogging up by piling up of dusts on the surface of the gas exchange membrane 310.

Outside air can be introduced through a duct not illustrated into a space behind the shoji 401 in which the gas exchange device 300 is installed. Therefore, gas exchange can be performed between the space in which the gas exchange device 300 is installed and the living etc. space 101 by using the shoji paper itself of the shoji 401 as the gas exchange membrane 310. Though not illustrated, a similar space is formed behind the shoji 402 and outside air can be introduced into the space through a duct not illustrated. These spaces are separated each other.

Construction of the building other than the above is the same as the first embodiment.

According to the second embodiment, it is possible to obtain the same advantages as the first embodiment.

EXAMPLES

Example 1

In the example 1, described is an example of the gas exchange device 300, which was actually made, used in the building according to the first embodiment.

FIG. 13A, FIG. 13B, FIG. 13C, FIG. 13D and FIG. 13E are pictures showing the gas exchange device 300. Here, FIG. 13A, FIG. 13B, FIG. 13C, FIG. 13D and FIG. 13E are a picture taken of mainly the side of the gas exchange part of the gas exchange device 300, a picture taken of the top of the gas exchange part, a picture taken of the top and the side of the gas exchange part(FIG. 13C and FIG. 13D) and a picture taken of the side of the gas exchange device 300. The enclosure 368 is made of iron and the flat boards 351, 352 and the spacers S1, S2 are made of wood. The intervals h1, h2 of the gas exchange membrane 310 of the gas exchange part 350 of the gas exchange device 300 are set to be h1=25 mm, h2=5 mm. That is, the interval of the gas exchange membranes 310 of both planes of the passage through which outside air flows and the interval of the gas exchange membranes 310 of both planes of the passage through which inside air flows are asymmetrically set. Size of the gas exchange part 350 is 60 cm×60 cm×30 cm, size of the gas exchange membrane 310 is 58 cm×58 cm and number of the gas exchange membrane 310 is 19 as the same as the example shown in FIG. 3~FIG. 6. The total area of the gas exchange membrane 310 of the gas exchange device 300 (G×B) is about 6.4 $m^2$.

Example 2

The example 2 corresponds to the second embodiment.

Figure 14:
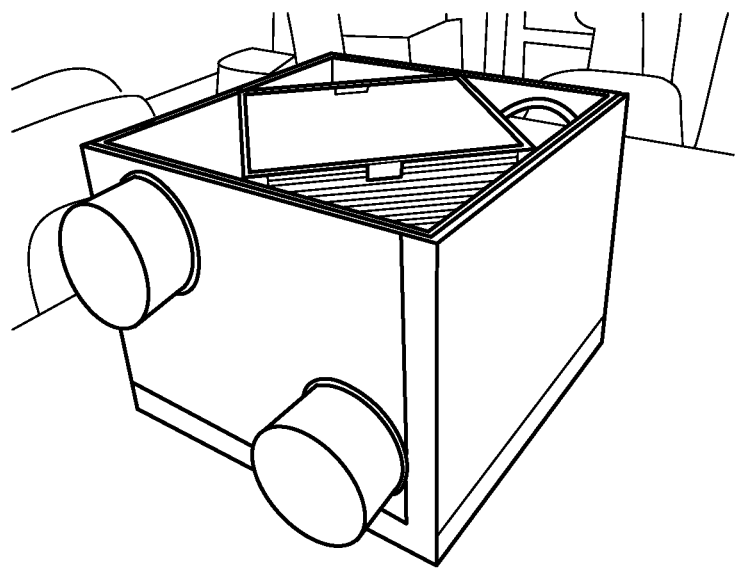
FIG. 14 A substitute picture for a drawing showing the gas exchange device that was made in the example 2.

FIG. 14 is a picture showing the gas exchange device 300 that was made in the example 2. Here, in FIG. 14, the front board of the gas exchange device 300 is removed and therefore the gas exchange part 350 inside the gas exchange device 300 can be seen. The flat boards 351, 352 and the spacers S1, S2 are made of wood. The intervals h1, h2 of the gas exchange membrane 310 of the gas exchange part 350 of the gas exchange device 300 are set to be h1=h2=10 mm. That is, the interval of the gas exchange membranes 310 of both planes of the passage through which outside air flows and the interval of the gas exchange membranes 310 of both planes of the passage through which inside air flows are symmetrically set. Size of the gas exchange part 350 is 31 cm×31 cm×30 cm, size of the gas exchange membrane 310 is 30 cm×30 cm and number of the gas exchange membrane 310 is 29. The total area of the gas exchange membrane 310 of the gas exchange device 300 (G×B) is about 2.6 $m^2$. Here, a fan filter unit installed on the ceiling wall 104 of the living etc. space 101 is used instead of the wall-mounted air conditioner. A pair of openings is formed in parts of the ceiling wall 104 corresponding to an air absorption opening and an air blow opening of the fan filter unit, respectively. And air inside the living etc. space 101 is absorbed from the opening formed in the part of the ceiling wall 104 corresponding to the air absorption opening of the fan filter unit, then air enters into the air absorption opening of the fan filter unit and finally all of air cleaned by the fan filter unit is blown inside the living etc. space 101. Flow rate of the fan filter unit is set to be about 20 $m^3$/min. The volume of the living etc. space 101 of the room 100 is about 70 $m^3$. The area of the gas exchange membrane 310 of the shojis 401, 402 is about 3.3 $m^2$.

Figure 15:
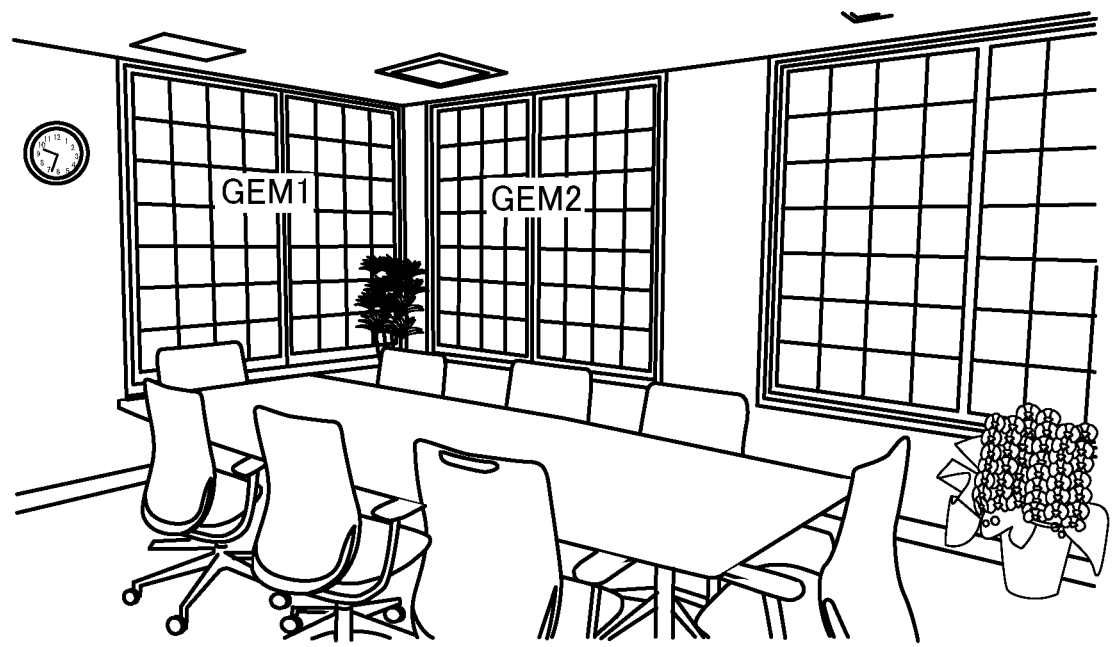
FIG. 15 A substitute picture for a drawing showing a living etc. space of a room of a building according to the example 2.
Figure 16:
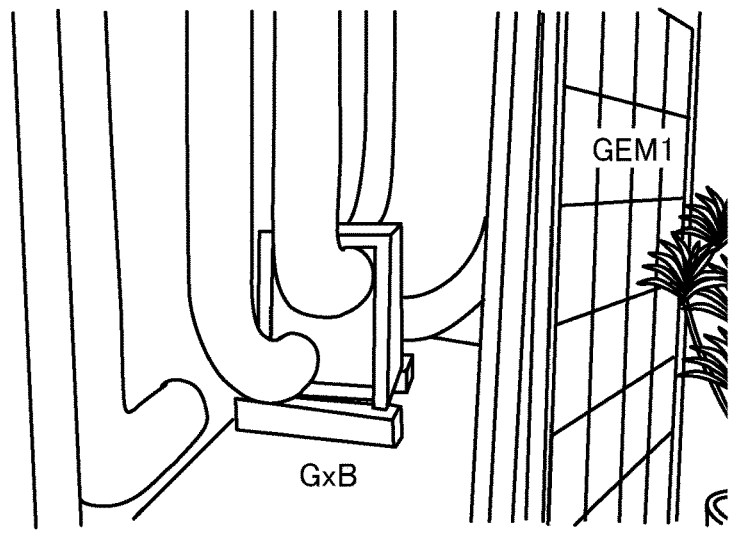
FIG. 16 A substitute picture for a drawing showing the state where the gas exchange device shown in FIG. 14 is installed in a space behind one shoji of the living etc. space shown in FIG. 15.

FIG. 15 is a picture of the living etc. space 101 used in the embodiment 2 taken from the inside of the living etc. space 101. Size of the living etc. space 101 is about 17 mats. FIG. 16 is a picture showing the state where the gas exchange device 300 shown in FIG. 14 is installed in the space behind one shoji 401 of the living etc. space 101 shown in FIG. 15.

Figure 17A:
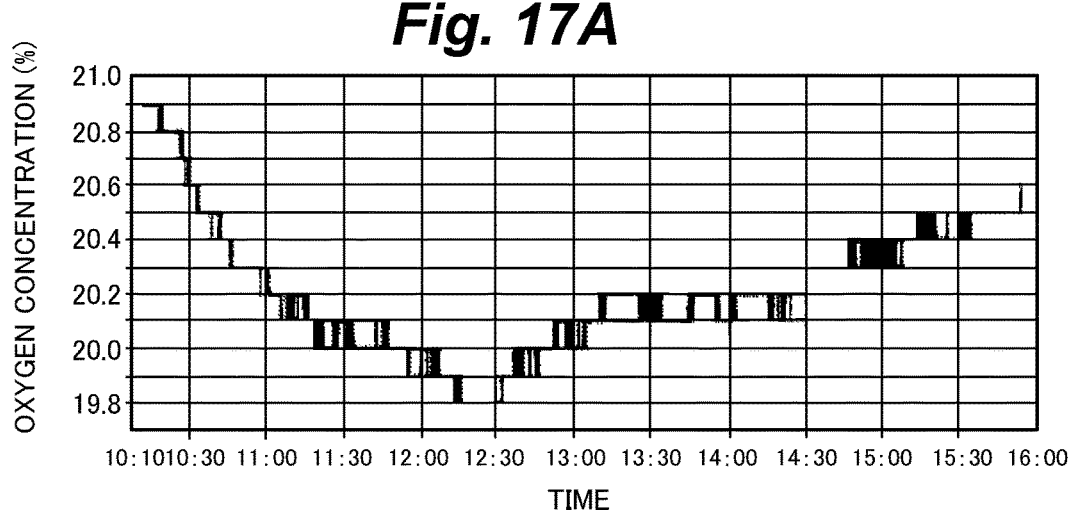
FIG. 17A A schematic diagram showing the result of measurement of a change over time of the oxygen concentration when a gas ring was burned in the room in the example 2.
Figure 17B:
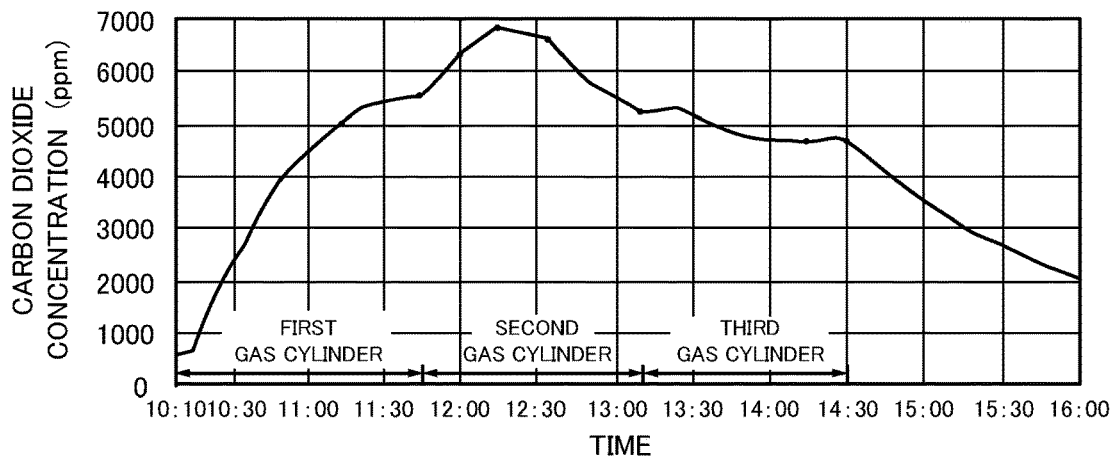
FIG. 17B A schematic diagram showing the result of measurement of a change over time of the carbon dioxide concentration when the gas ring was burned in the room in the example 2.

FIG. 17A and FIG. 17B show the result of measurement of a change of the oxygen concentration and the carbon dioxide concentration, respectively when a desktop gas ring was burned in the living etc. space 101. In the living etc. space 101 in which there is no exchange of an air current between the inside and the outside(F=0 in the above discussion), a cassette gas ring of butane was burned all the way to increase the carbon dioxide concentration once. FIG. 17B shows the change of the carbon dioxide concentration after the gas exchange device 300 was operated thereafter. The oxygen concentration was measured by using Oxyman Plus OM-25MP01 (Taiei engineering) and the carbon dioxide concentration was measured by using datalogger MC-383SD(SATOTECH). Combustion of butane is described as follows.

$$C_4H_{10}+6.5O_2=4CO_2+5H_2O$$

From this, it may be considered to be B'~0.6 B. When oxygen decreases by combustion from 20.9% to 19.9% by about 0.01 (i.e. 10000 ppm), it is predicted that carbon dioxide increases from the formula (20) as follows.

$$10000 \text{ ppm} \times 4/6.5 \approx 6200 \text{ ppm} \qquad (20)$$

Actually, when oxygen decreased to 19.8% at time 12:30 in FIG. 17A and FIG. 17B, carbon dioxide increased to about 6800 ppm from the initial value of about 400 ppm. This result coincides with the one predicted by the formula (20). Since definite symmetrical change over time can be seen for the oxygen concentration and the carbon dioxide concentration in FIG. 17A, it is understood that time constants of change of both concentrations and therefore the diffusion constants of oxygen and carbon dioxide in the gas exchange membrane 310 are nearly equal. The gas exchange membrane 310 (GEM2) (its area is about 3.3 m²) of the shoji 402 on the right of FIG. 9 was operated till time 11:45 and the gas exchange membrane 310 (GEM1) (its area is about 3.3 m²) of the shoji 401 on the left of FIG. 9 was also operated from time 11:15. First cylinder of butane gas fuel was dead at time 11:45. Therefore, second cylinder of butane gas fuel was used and the gas ring was burned all the way. Since the cylinder of butane gas fuel was full, the carbon dioxide concentration increased immediately. It was found that the cylinder butane gas fuel became empty (butane of 250 g was burned out) in about 80 minutes in this combustion condition. According to calculation based on the formula (2) from the combustion amount of fuel per unit time, this corresponds to the consumption amount of oxygen of about 31 persons. Although the number of persons is too much to be accommodated in the living etc. space 101 of the room 100 shown in FIG. 8, the oxygen concentration was kept to be 19.8%, which is not smaller than 18.5% (one standard of safety). When the gas exchange device 300 (G×B)(the total area is about 2.6 m²) was operated at time 12:30, the oxygen concentration turned to decreasing(this behavior is definitely described by the formula (16)). It was shown that the gas exchange device 300 in which the flow speed of gases near the gas exchange membrane 310 is large is more favorable than the gas exchange membrane 310. Although the carbon dioxide concentration became about 4800 ppm, which is below the hygiene limit value, it is very rare that 31 persons enter the living etc. space 101 of 17 mats. However, this suggests that it is not preferable for such many persons to stay in the room for a long time. If the number of persons is limited to several persons(4 persons for obeying the management standard of environment and hygiene of building and 8 persons for obeying the standard of environment and hygiene of school), it is understood that it is possible to stay in the living etc. space 101 of the room 100 equipped with the 100% circulation feedback system using the shojis 401, 402 and the gas exchange device 300 for a long time peacefully and safely(although ventilation amount by exchange of bulk air mass between the inside and the outside of the room is zero). Butane gas fuel was exchanged by third cylinder of butane gas fuel at time 13:10. However, decreasing tendency of carbon dioxide continued. From this, effect of the gas exchange device 300 can be confirmed. Comparing FIG. 17A and FIG. 17B, it is understood that it is possible to stop lowering of the oxygen concentration in the living etc. space 101 by operating the 100% circulation feedback system using the gas exchange membrane 310 and the gas exchange device 300 in the living etc. space 101 and prevent the carbon dioxide concentration from increasing at the same time. It was demonstrated that gas exchange was performed efficiently.

Example 3

Figure 18:
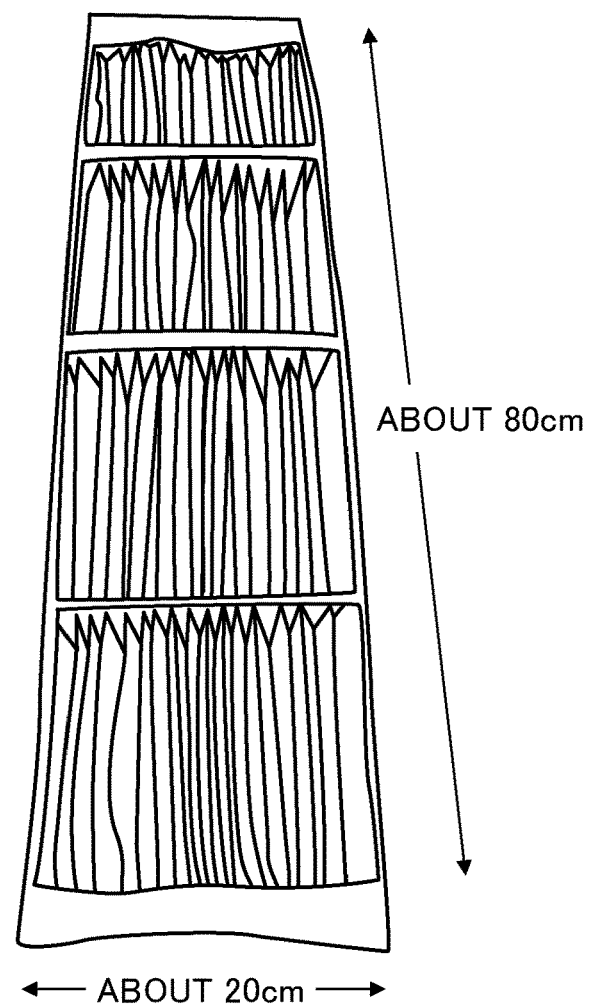
FIG. 18 A substitute picture for a drawing showing a prefilter that was made in the example 3.
Figure 19:
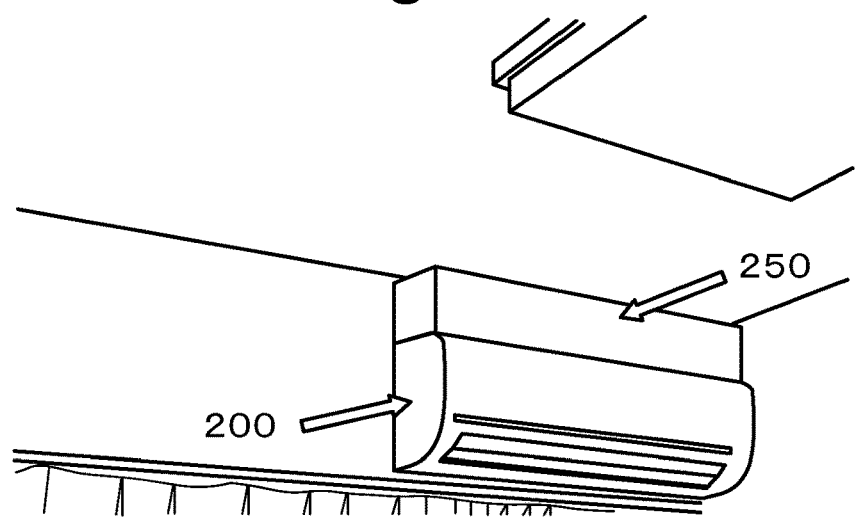
FIG. 19 A substitute picture for a drawing showing the state where the prefilter that was made in the example 3 was attached to an air absorption opening of an air conditioner installed on the wall of a conventional general room.

As shown in FIG. 18, the prefilter 250 was made. In the prefilter 250, a box with a width of about 20 cm and a length of about 80 cm was divided into four spaces by partition boards and filter material folded like mountain-shape and valley-shape are enclosed in respective spaces. Here, ASA-HIPEN shoji paper No. 5641 was used as filter materials for easy working. FIG. 19 shows an example in which the prefilter shown in FIG. 18 was attached to the air absorption opening of the top of the usual wall-mounted air conditioner installed on the wall of a conventional general room in which the density of dust particles is high. As the air conditioner, RAS-KJ22B(W) made by Hitachi, Ltd. was used. A tape was used to seal up the top of the air conditioner and the prefilter.

Figure 20:
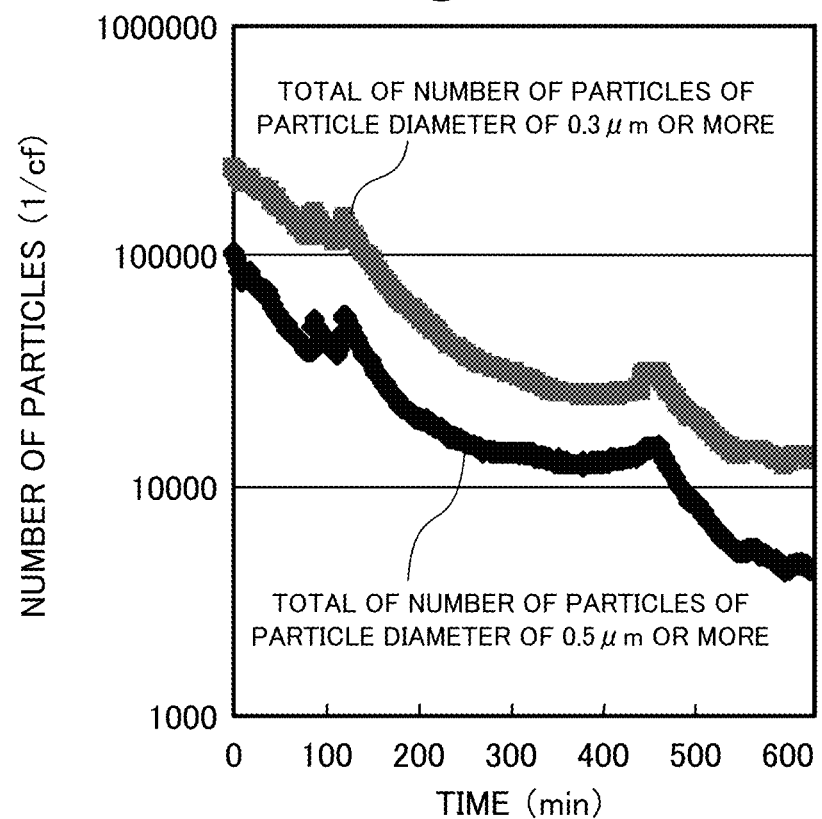
FIG. 20 A schematic diagram showing the result of measurement of a change over time of the density of dust particles when a conventional general room was cleaned using the air conditioner installed on the wall of the room and the prefilter that was attached to the air absorption opening of the air conditioner.

FIG. 20 shows the result of measurement of a change over time of the density of dust particles in the room when the air conditioner 200 in which the prefilter 250 was attached to the air absorption opening was operated in the room shown in FIG. 19. As shown in FIG. 20, cleanliness of the room was US 209D class a hundred and twenty thousand and there were many dusts before the air conditioner 200 with the prefilter 250 was operated, while after operation of the air conditioner 200 the density of dust particles began to decrease rapidly and the density of dust particles decreased to US 209D class 4000, which is about one-thirtieth after 10 hours passed. That is, although the collection efficiency γ of the medium performance filter used for the prefilter 250 is never high, high cleanliness could be attained according to the formula (5) described above. By selecting materials of the prefilter 250 so that the collection efficiency γ is nearer to 1 and the pressure loss is low and large flow rate can be obtained, it is possible to realize remarkably high cleanliness more shortly according to the formula (5).

Figure 21:
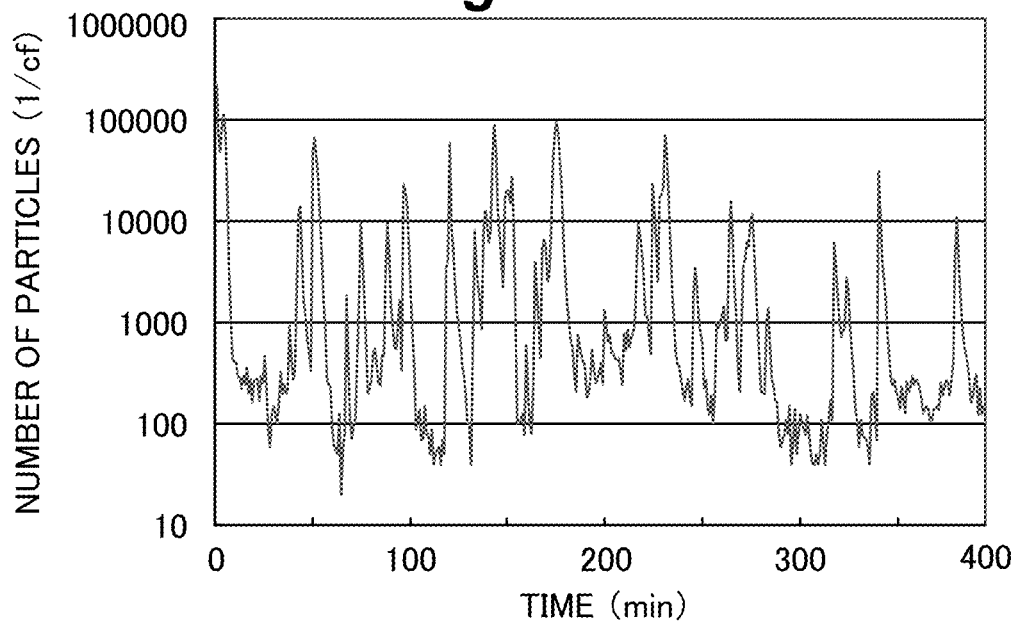
FIG. 21 A schematic diagram showing the result of demonstration of the lifetime of a medium performance filter that is used for the prefilter.

Described now is the result of estimation of the lifetime of the medium performance filter used as the prefilter 250. A tent-like structure in which all of planes forming the structure are made of the gas exchange membrane was made. The tent-like structure was disposed on the floor of a bedroom of an apartment and a subject slept on a futon spread on the floor. A fan filter unit and a dust counter(a particle counter) were disposed on the floor inside the tent. An air cleaner made by Panasonic Corporation (F-PDH35) was used as the fan filter unit. The air cleaner uses a medium performance filter with γ=98%. While the inside of the tent was cleaned by operating the air cleaner continuously, the subject slept in usual living rhythm. After the air cleaner was operated for about four years, the density of dust particles inside the tent was measured by the dust counter during sleep. FIG. 21 shows the result. As shown in FIG. 21, the operation characteristic of the air cleaner was not degraded after the air cleaner was continuously used for about four years. This is because clogging up of the medium performance filter is difficult to occur.

Figure 22:
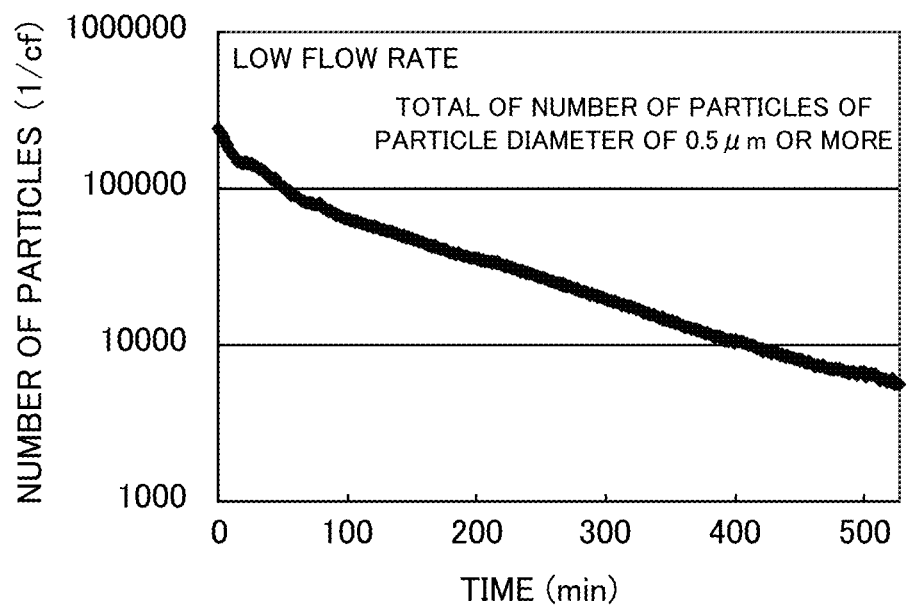
FIG. 22 A schematic diagram showing the result of measurement of a change over time of the density of dust particles when the air conditioner was operated setting the flow rate to be low in the example 3.
Figure 23:
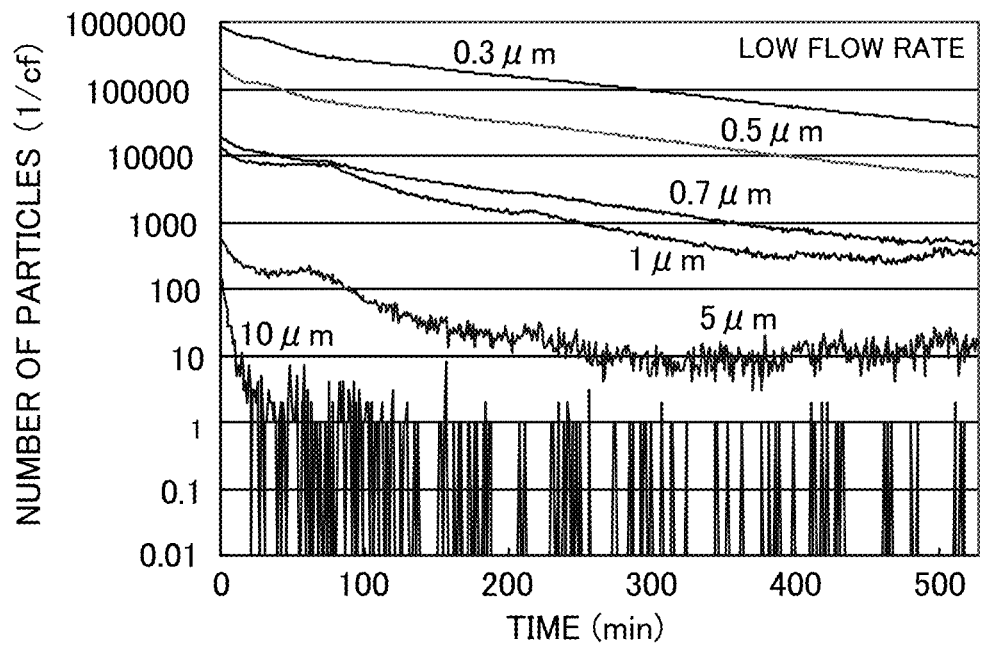
FIG. 23 A schematic diagram showing the result of measurement of a change over time of the density of dust particles according to their particle diameters when the air conditioner was operated setting the flow rate to be low in the example 3.
Figure 24:
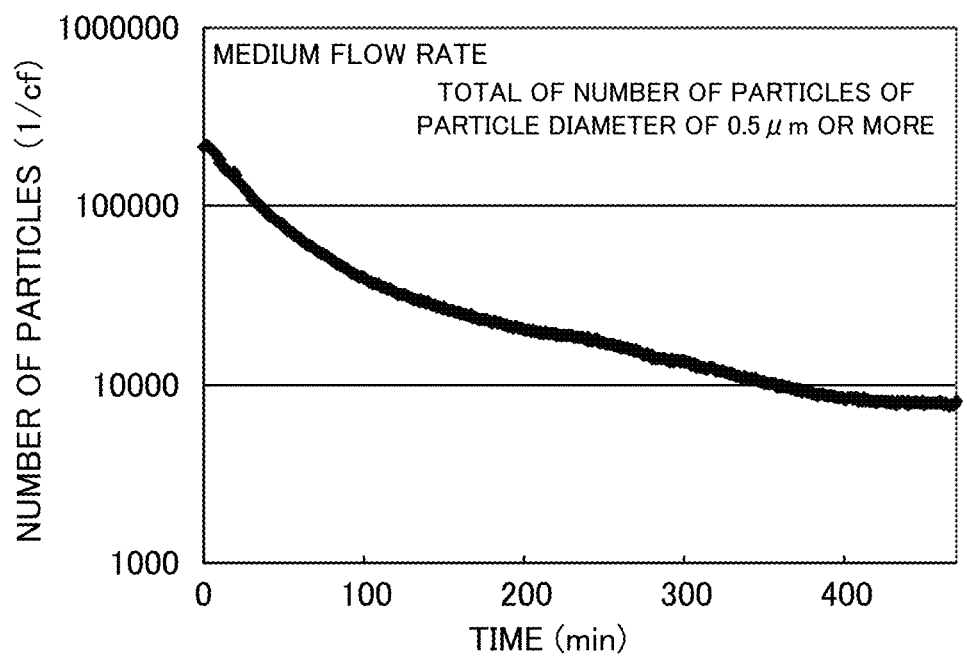
FIG. 24 A schematic diagram showing the result of measurement of a change over time of the density of dust particles when the air conditioner was operated setting the flow rate to be medium in the example 3.
Figure 25:
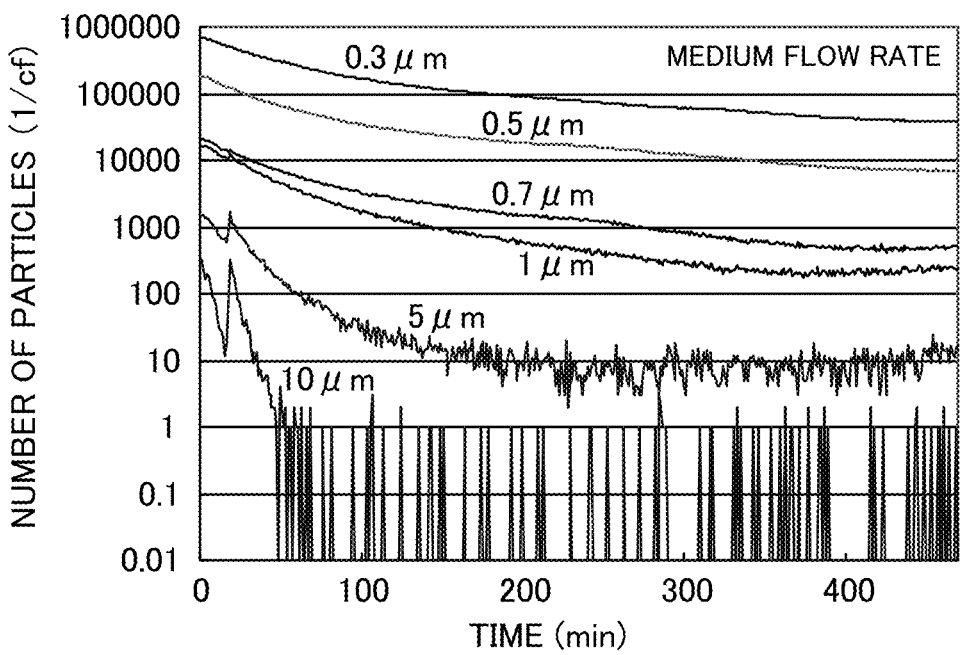
FIG. 25 A schematic diagram showing the result of measurement of a change over time of the density of dust particles according to their particle diameters when the air conditioner was operated setting the flow rate to be medium in the example 3.
Figure 26:
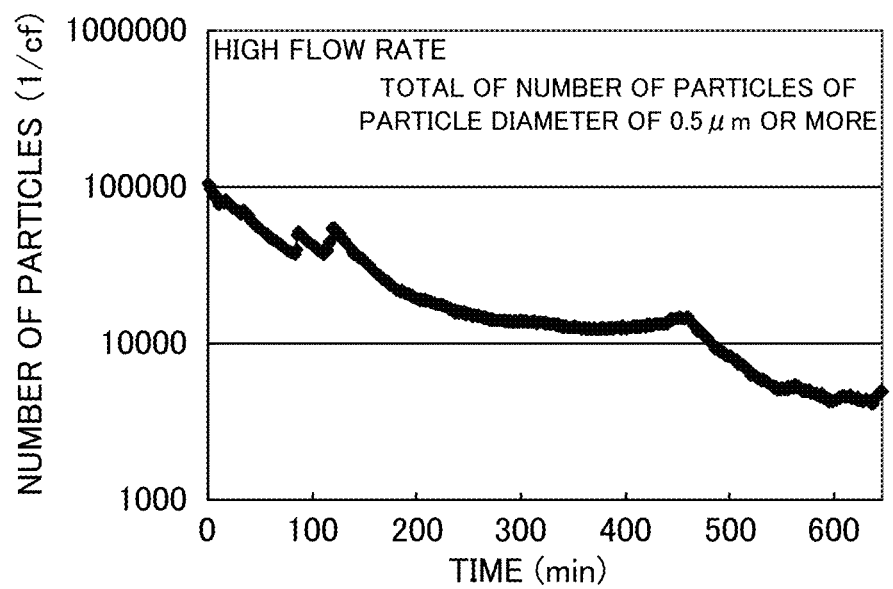
FIG. 26 A schematic diagram showing the result of measurement of a change over time of the density of dust particles when the air conditioner was operated setting the flow rate to be high in the example 3.
Figure 27:
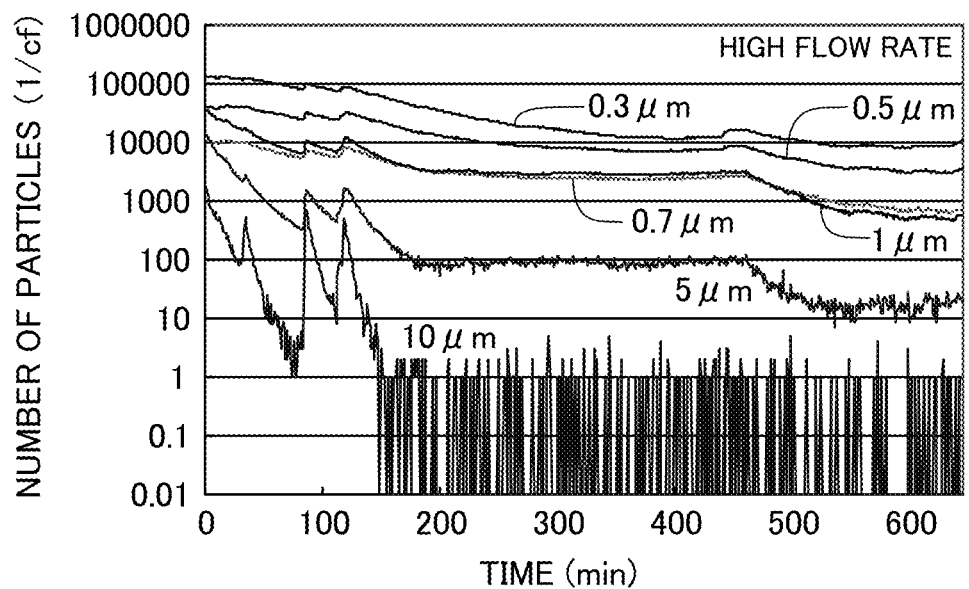
FIG. 27 A schematic diagram showing the result of measurement of a change over time of the density of dust particles according to their diameters when the air conditioner was operated setting the flow rate to be high in the example 3.

Described now is the result of experiment investigating a change over time of the density of dust particles in the room shown in FIG. 19 when the air conditioner 200 with the prefilter 250 attached to the air absorption opening was operated in the room while its flow rate was changed at three levels, that is, low flow rate, medium flow rate and high flow rate, and decrease of the number of particles according to their particle diameters at each flow rate. The change over time of the density of dust particles in the room when the air conditioner 200 was operated at low flow rate, medium flow rate and high flow rate is shown in FIG. 22, FIG. 24 and FIG. 26, respectively. Decrease of the number of dust particles according to their particle diameters when the air conditioner 200 was operated at low flow rate, medium flow rate and high flow rate is shown in FIG. 23, FIG. 25 and FIG. 27, respectively. From FIG. 22, FIG. 24 and FIG. 26, it is understood that the total of the number of dust particles of particle diameter of 0.5 μm or more decreases with time irrespective of flow rate. Furthermore, from FIG. 23, FIG. 25 and FIG. 27, it is understood that since shoji paper (ASA-HIPEN shoji paper No. 5641) was used as the filter materials of the prefilter 250, particles of particle diameter of 10 μm or more can be well collected, while the collection efficiency γ tends to decrease according to decrease of particle diameter. It is also understood that since air inside the room is filtered by passing through the prefilter 250 repeatedly by the air circulation performance of the air conditioner 200, collection of particles of particle diameter not larger than 10 μm proceeds gradually with time.

Example 4

Figure 28:
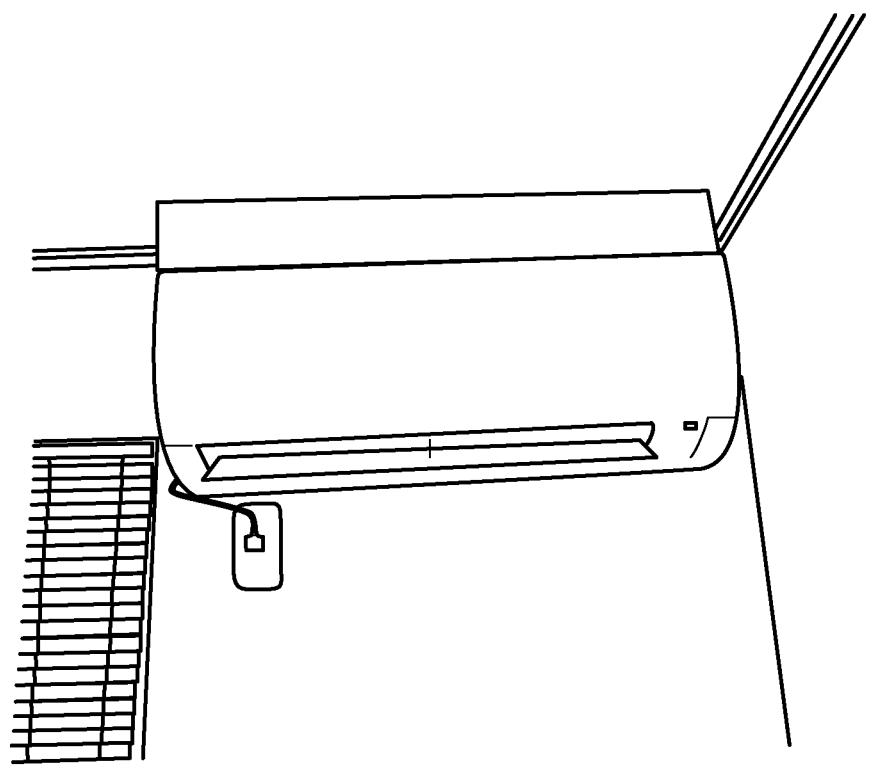
FIG. 28 A substitute picture for a drawing showing the state where the prefilter shown in FIG. 18 was attached to the air absorption opening of the air conditioner installed on the wall of a conventional general room in the example 4.

FIG. 28 shows an example in which the prefilter shown in FIG. 18 was attached to the air absorption opening of the top of the usual wall-mounted air conditioner installed on the wall of the conventional general room in which the density of dust particles is high. Here, S25TTES-W made by DAIKIN INDUSTRIES, LTD was used as the air conditioner. A tape was used to seal up the top of the air conditioner and the prefilter.

Figure 29:
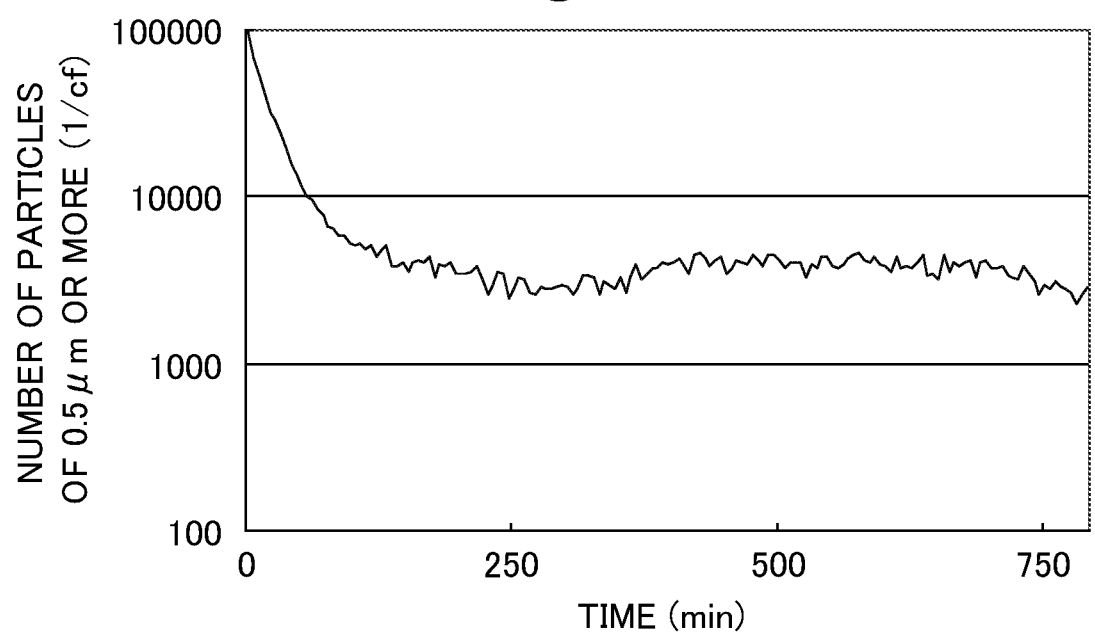
FIG. 29 A schematic diagram showing the result of measurement of a change over time of the density of dust particles when the air conditioner was operated in the example 4.

FIG. 29 shows the result of measurement of a change over time of the density of dust particles in the room when the air conditioner 200 with the prefilter 250 attached to the air absorption opening was operated in the room. As shown in FIG. 29, cleanliness of the room was US 209D class a hundred thousand and there were many dusts before the air conditioner 200 with the prefilter 250 was operated, while after operation of the air conditioner 200 the density of dust particles began to decrease rapidly and the density of dust particles decreased to US 209D class 4000, which is about $1/25$ after 4 hours passed.

Example 5

Figure 30:
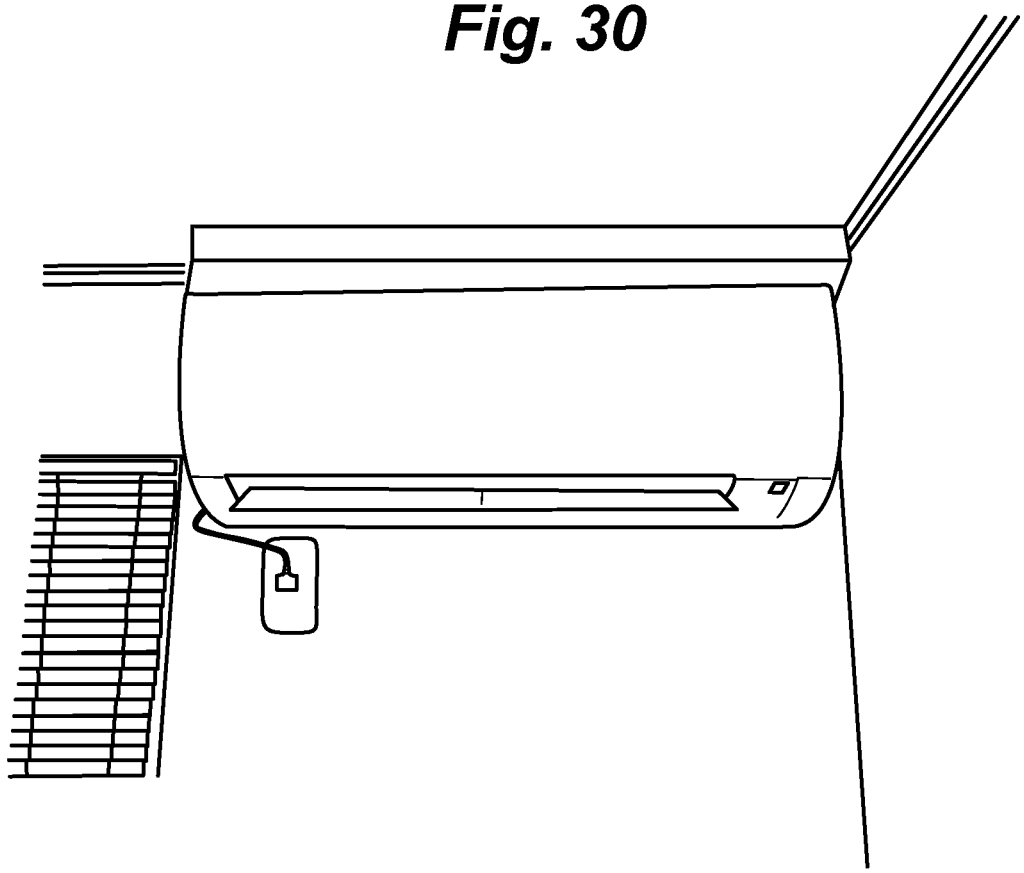
FIG. 30 A substitute picture for a drawing showing the state where a commercially available medium performance filter as the prefilter was attached to the air absorption opening of the air conditioner installed on the wall of a conventional general room in the example 5.
Figure 31:
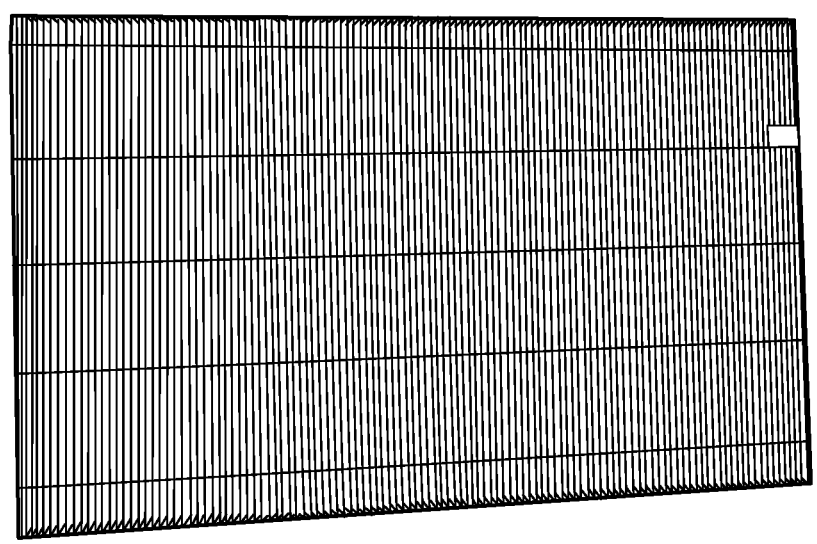
FIG. 31 A substitute picture for a drawing showing the commercially available medium performance filter that was used in the example 5.

FIG. 30 shows an example in which a commercial medium performance filter was attached as the prefilter 250 to the air absorption opening of the top of the usual wall-mounted air conditioner installed on the wall of the conventional general room in which the density of dust particles is high. Here, S25TTES-W made by DAIKIN INDUSTRIES, LTD was used as the air conditioner. A tape was used to seal up the top of the air conditioner and the prefilter. FIG. 31 shows a picture taken of the commercial medium performance filter used as the prefilter 250 (dust collection filter KAFPO44A4 made by DAIKIN INDUSTRIES, LTD).

Figure 32:
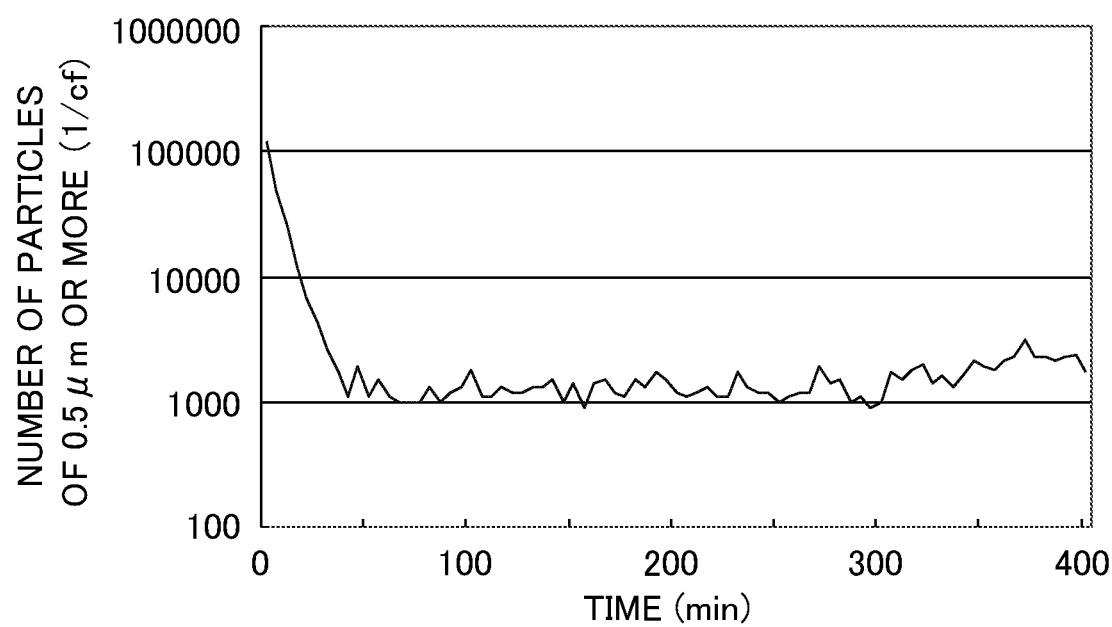
FIG. 32 A schematic diagram showing the result of measurement of a change over time of the density of dust particles when the air conditioner was operated in the example 5.

FIG. 32 shows the result of measurement of a change over time of the density of dust particles in the room when the air conditioner 200 with the prefilter 250 attached to the air absorption opening was operated in the room. As shown in FIG. 32, cleanliness of the room was US 209D class a hundred thousand and there were many dusts before the air conditioner 200 with the prefilter 250 was operated, while after operation of the air conditioner 200 the density of dust particles began to decrease rapidly and the density of dust particles decreased to US 209D class 1000, which is about $1/10$ after 50 minutes passed.

Example 6

Figure 33:
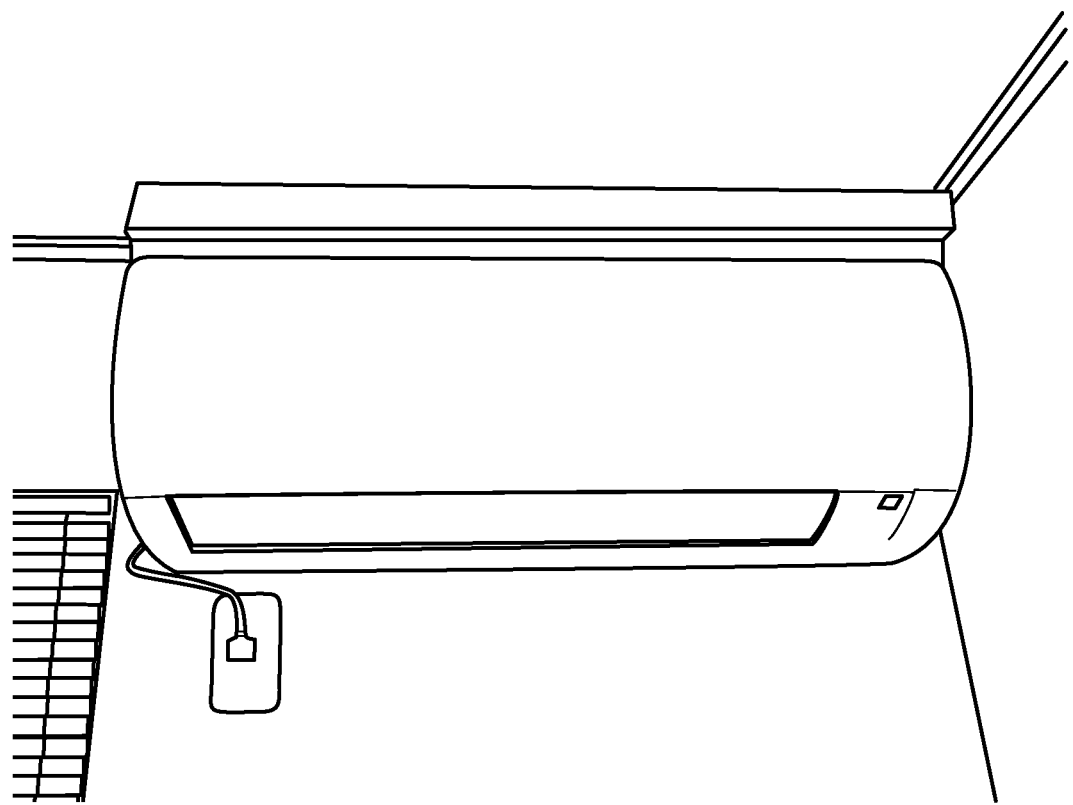
FIG. 33 A substitute picture for a drawing showing the state where a commercially available medium performance filter as the prefilter was attached to the air absorption opening of the air conditioner installed on the wall of a conventional general room in the example 6.
Figure 34:
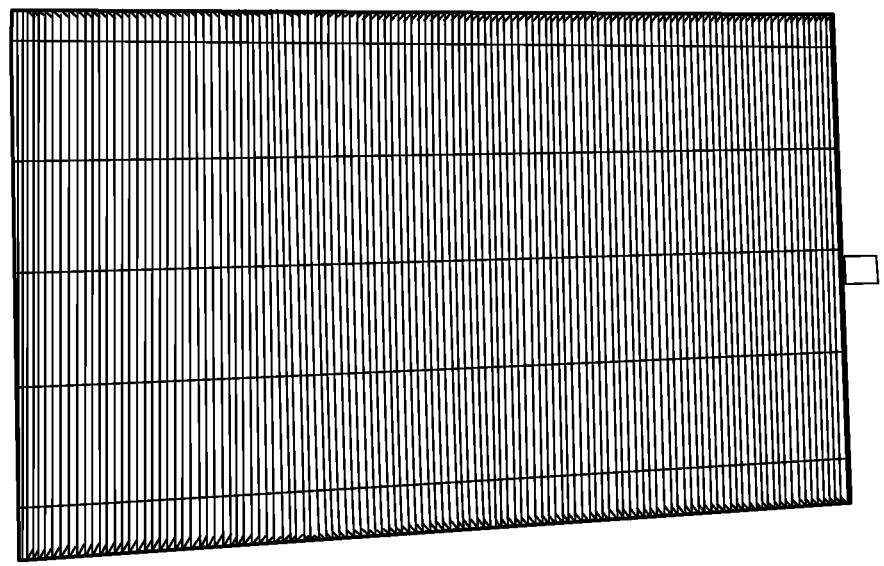
FIG. 34 A substitute picture for a drawing showing the commercially available medium performance filter that was used in the example 6.

FIG. 33 shows an example in which a commercial medium performance filter was attached as the prefilter 250 to the air absorption opening of the top of the usual wall-mounted air conditioner installed on the wall of the conventional general room in which the density of dust particles is high. Here, S25TTES-W made by DAIKIN INDUSTRIES, LTD was used as the air conditioner. A tape was used to seal up the top of the air conditioner and the prefilter. FIG. 34 shows a picture taken of the commercial medium performance filter used as the prefilter 250 (filter for exchange for the air cleaner FZ-Z51HF made by SHARP CORPORATION).

Figure 35:
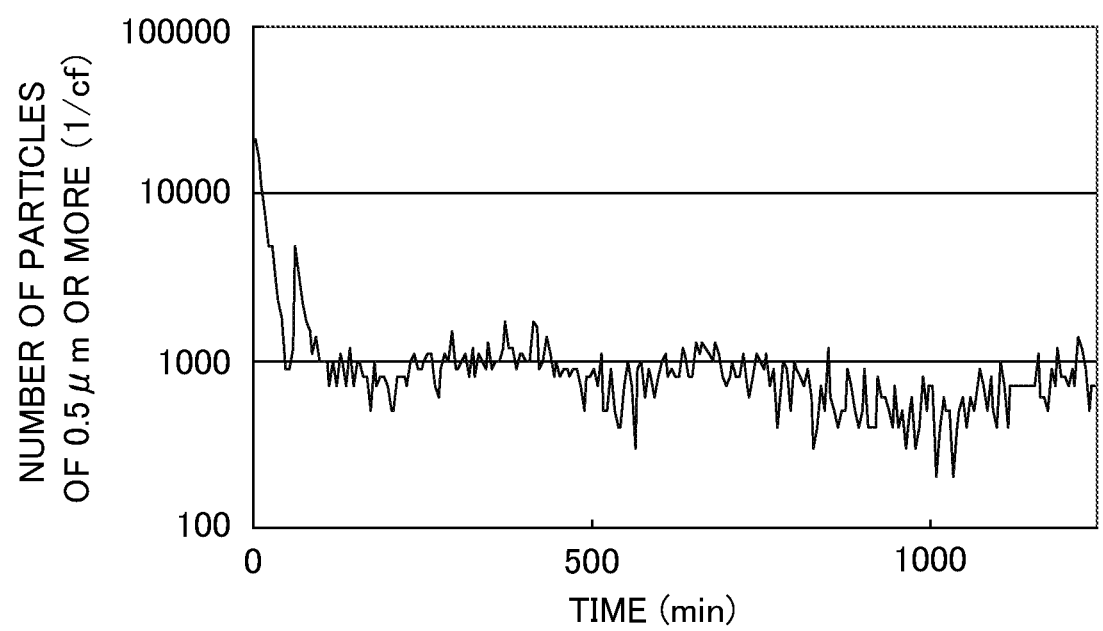
FIG. 35 A schematic diagram showing the result of measurement of a change over time of the density of dust particles when the air conditioner was operated in the example 6.

FIG. 35 shows the result of measurement of a change over time of the density of dust particles in the room when the air conditioner 200 with the prefilter 250 attached to the air absorption opening was operated in the room. As shown in FIG. 35, cleanliness of the room was US 209D class thirty thousand and there were many dusts before the air conditioner 200 with the prefilter 250 was operated, while after operation of the air conditioner 200 the density of dust particles began to decrease rapidly and the density of dust particles decreased to US 209D class 300, which is about $1/100$ after 1 hour passed.

Heretofore, embodiments and examples of the invention have been described specifically. However, the invention is not limited to these embodiments and examples, but contemplates various changes and modifications based on the technical idea of the invention.

For example, oxygen and carbon dioxide are exemplified as gas molecules in the embodiments. However, it is possible to apply to carbon monoxide CO, hydrogen sulfide H2S, etc. other than these according to nature of region such as a hot spring region etc. or according to situations such as a one-pot dish cooked at the table using a charcoal briquette (if ξ,ξ0used for carbon dioxide are defined again for gas species of interest, the above formula and formula transformation can be applied. Of course, ξ0∼0 for CO, H2S in the usual living etc. space 101). Furthermore, numerical numbers, structures, constitutions, shapes, materials, etc. presented in the above embodiments and examples are only examples, and the different numerical numbers, structures, constitutions, shapes, materials, etc. may be used as necessary.

EXPLANATION OF REFERENCE NUMERALS

10 . . . air supply opening, 20 . . . air exhaustion opening, 100 . . . room, 101 . . . living etc. space, 103 . . . roof, 104 . . . ceiling wall, 104a, 104b, 104c, 104d . . . opening, 105, 106 . . . sidewall, 200 . . . air conditioner, 250 . . . prefilter, 250a . . . box, 250b . . . partition board, 250c . . . filter material, 300 . . . gas exchange device, 301 . . . inside air collection opening, 302 . . . return opening, 303 . . . outside air introduction opening, 304 . . . exhaustion opening, 310 . . . gas exchange membrane, 350 . . . gas exchange part, 360 . . . enclosure, 401, 402 . . . shoji

The invention claimed is:

1. A building comprising:
at least one room,
the room having inside a living and/or activity space that is an enclosed space,
if performing ventilation of an air flow F from the outside to the living and/or activity space,
assuming that the volume of the living and/or activity space is denoted as V, the gas consumption amount inside the living and/or activity space is denoted as $B(m^3/s)$, the gas concentration inside the living and/or activity space at time t is denoted as $\eta(t)$, and the gas concentration of the outside is denoted as $\eta 0$, $\eta(t)$ being given as follows when air inside the living and/or activity space is sufficiently agitated and the concentration of respective gas molecules constituting the air is made spatially uniform:

$$\eta(t) = \eta_o - \frac{B}{F}(1 - \exp(-Ft/V)) \quad (3)$$

eliminating entering/exiting of air as an air current between the inside of the living and/or activity space and the outside, and at least a part of the boundary between the living and/or activity space and the outside being configured from a membrane not passing through dust particles but passing through gas molecules having a diffusion constant D, a thickness L, and an area A for gas molecules of interest, $\eta(t)$ being controlled so as to vary according to the following formula when air inside the living and/or activity space is sufficiently agitated and the concentration of respective gas molecules constituting the air is made spatially uniform:

$$\eta(t) = \eta_o - \frac{BL}{AD}(1 - \exp(-[AD/L]t/V)) \quad (9)$$

further the area A of the membrane being set so as to satisfy
A≥FL/D
between F and the area A of the membrane where F is ventilation air flow required by law or other reasons,
wherein the building further includes at least one gas exchange device,
the gas exchange device having a box-like structure constituting an enclosed space with at least two gas absorption openings and at least two gas exhaustion openings,
one of the at least two gas absorption openings communicating with one of the at least two gas exhaustion openings and the other one of the at least two gas absorption openings communicating with the other one of the at least two gas exhaustion openings,
the two communicating paths being configured so that while they form independent paths respectively, they lies adjacent each other and they are separated by the membrane not passing through dust particles but passing through gas molecules,
air introduced from the outside space surrounding the room being introduced into the box-like structure of the gas exchange device from one of the gas absorption openings and sent out to the outside space from the gas blow opening communicating with the gas absorption opening, while air inside the living and/or activity space being introduced into the box-like structure of the gas exchange device from the other one of the gas absorption openings and returned to the living and/or activity space from the gas exhaustion opening communicating with the gas absorption opening,
the membrane having the area A' set by scaling of $\{(V/A')/(D'/L)\}$ where V is the volume of the living and/or activity space, A' is the area of the membrane, L is the thickness of the membrane, and D' is the diffusion constant of carbon dioxide in the membrane,
the area A' of the membrane being set so as to satisfy $$A' > \frac{B'L}{(\xi - \xi_o)D'} \quad (18)$$

where B is the carbon dioxide generation rate inside the living and/or activity space, $\xi 0$ is the carbon dioxide concentration in equilibrium state with the outside when no carbon dioxide is generated in the living and/or activity space, and $\xi(\xi \leq 5000$ ppm) is the target carbon dioxide concentration inside the living and/or activity space.

2. The building according to claim 1 wherein a wall-mounted air conditioner is installed on the wall of the living and/or activity space, a prefilter using a medium performance filter is attached to an absorption opening of the top of the air conditioner, and all of gases flowing inside the living and/or activity space from a blow opening of the air conditioner is returned to the absorption opening of the prefilter.

3. A building comprising:
at least one room,
the room having inside a living and/or activity space that is an enclosed space,
if performing ventilation of an air flow F from the outside to the living and/or activity space,
assuming that the volume of the living and/or activity space is denoted as V, the gas consumption amount inside the living and/or activity space is denoted as $B(m^3/s)$, the gas concentration inside the living and/or activity space at time t is denoted as $\eta(t)$, and the gas concentration of the outside is denoted as $\eta 0$, $\eta(t)$ being given as follows when air inside the living and/or activity space is sufficiently agitated and the concentration of respective gas molecules constituting the air is made spatially uniform:

$$\eta(t) = \eta_o - \frac{B}{F}(1 - \exp(-Ft/V)) \quad (3)$$

eliminating entering/exiting of air as an air current between the inside of the living and/or activity space and the outside, and at least a part of the boundary between the living and/or activity space and the outside being configured from a membrane not passing through dust particles but passing through gas molecules having a diffusion constant D, a thickness L, and an area A for gas molecules of interest, $\eta(t)$ being controlled so as to vary according to the following formula when air inside the living and/or activity space is sufficiently agitated and the concentration of respective gas molecules constituting the air is made spatially uniform:

$$\eta(t) = \eta_o - \frac{BL}{AD}(1 - \exp(-[AD/L]t/V)) \qquad (9)$$

further the area A of the membrane being set so as to satisfy

A≥FL/D between F and the area A of the membrane where F is ventilation air flow required by law or other reasons, wherein at least one gas exchange device, the gas exchange device having a box-like structure constituting an enclosed space with at least two gas absorption openings and at least two gas exhaustion openings, one of the at least two gas absorption openings communicating with one of the at least two gas exhaustion openings and the other one of the at least two gas absorption openings communicating with the other one of the at least two gas exhaustion openings, the two communicating paths being configured so that while they form independent paths respectively, they lies adjacent each other and they are separated by the membrane not passing through dust particles but passing through gas molecules, air introduced from the outside space surrounding the room being introduced into the box-like structure of the gas exchange device from one of the gas absorption openings and sent out to the outside space from the gas blow opening communicating with the gas absorption opening, while air inside the living and/or activity space being introduced into the box-like structure of the gas exchange device from the other one of the gas absorption openings and returned to the living and/or activity space from the gas exhaustion opening communicating with the gas absorption opening, the membrane having the area not less than MAX(Amin, A'min) where Amin is the lower limit of the area A of the membrane obtained by the following (1) and A'min is the lower limit of the area A' of the membrane obtained by the following (2), (1) the area A of the membrane satisfying A≥FL/D where A is the area of the membrane, L is the thickness of the membrane, D is the diffusion constant of gas molecules in the membrane and F is the ventilation air flow required for the living and/or activity space by law or other reasons, (2) the area A' of the membrane satisfying $$A' > \frac{B'L}{(\xi - \xi_o)D'} \qquad (18)$$

where the area A' of the membrane is set by scaling of $\{(V/A')/(D'/L)\}$ where V is the volume of the living and/or activity space, A' is the area of the membrane, L is the thickness of the membrane, and D' is the diffusion constant of carbon dioxide in the membrane, B' is the carbon dioxide generation rate inside the living and/or activity space, $\xi_0$ is the carbon dioxide concentration in equilibrium state with the outside when no carbon dioxide is generated inside the living and/or activity space, and $\xi(\xi<5000$ ppm) is the target carbon dioxide concentration inside the living and/or activity space.

4. The building according to claim 1 wherein in the gas exchange device air inside the living and/or activity space is introduced into the box-like structure from the other one of the gas absorption openings and air flow f returned to the living and/or activity space from the gas exhaustion opening communicating with the gas absorption opening is set for F so as to satisfy f≥F.

5. The building according to claim 1 wherein the gas exchange device is installed in a space between the wall constituting the room and the living and/or activity space.

6. The building according to claim 2 wherein the medium performance filter is made of shoji paper, non-woven fabric, synthetic fiber or cellulose-based fiber that is folded repeatedly.

* * * * *